(12) United States Patent
Yamada et al.

(10) Patent No.: US 9,076,463 B2
(45) Date of Patent: Jul. 7, 2015

(54) MAGNETIC RECORDING HEAD AND DISK DEVICE WITH THE SAME

(71) Applicant: KABUSHIKI KAISHA TOSHIBA, Minato-ku (JP)

(72) Inventors: Kenichiro Yamada, Tokyo (JP); Katsuhiko Koui, Yokohama (JP); Akihiko Takeo, Kokubunji (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 8 days.

(21) Appl. No.: 14/063,344

(22) Filed: Oct. 25, 2013

(65) Prior Publication Data

US 2015/0043106 A1    Feb. 12, 2015

Related U.S. Application Data

(60) Provisional application No. 61/864,195, filed on Aug. 9, 2013.

(51) Int. Cl.
*G11B 5/127* (2006.01)
*G11B 5/00* (2006.01)

(52) U.S. Cl.
CPC ...... *G11B 5/1278* (2013.01); *G11B 2005/0024* (2013.01)

(58) Field of Classification Search
CPC .............. G11B 5/1278; G11B 2005/0024; G11B 5/02; G11B 5/3133
USPC ........................................ 360/125.3
See application file for complete search history.

(56) References Cited

U.S. PATENT DOCUMENTS

| | | | |
|---|---|---|---|
| 8,139,322 B2 | 3/2012 | Yamada et al. | |
| 8,164,854 B2 | 4/2012 | Takagishi et al. | |
| 8,238,058 B2 * | 8/2012 | Shimizu et al. | 360/125.02 |
| 8,270,112 B2 * | 9/2012 | Funayama et al. | 360/125.31 |
| 8,310,756 B2 | 11/2012 | Choi | |
| 2009/0052095 A1 | 2/2009 | Yamada et al. | |
| 2009/0080120 A1 | 3/2009 | Funayama et al. | |
| 2010/0220415 A1 | 9/2010 | Yamada et al. | |
| 2011/0279324 A1 | 11/2011 | Bolotski et al. | |
| 2011/0299192 A1 | 12/2011 | Yamada et al. | |
| 2011/0300409 A1 | 12/2011 | Yamada et al. | |
| 2012/0268844 A1 | 10/2012 | Yamada et al. | |

FOREIGN PATENT DOCUMENTS

JP    2009-70541    4/2009
JP    2009-80867    4/2009

* cited by examiner

*Primary Examiner* — Mark Blouin
(74) *Attorney, Agent, or Firm* — Oblon, McClelland, Maier & Neustadt, L.L.P.

(57) ABSTRACT

According to one embodiment, a magnetic head includes a main pole configured to apply a recording magnetic field to a recording layer included in a recording medium, a trailing shield opposing the main pole in a down-track direction, with a write gap interposed therebetween, a pair of side shields opposing the main pole on opposite sides of the main pole in a cross-track direction, with respective gaps interposed therebetween, a recording coil configured to cause the main pole to generate a magnetic field, a first high-frequency oscillator interposed between the main pole and one of the side shields, and a second high-frequency oscillator interposed between the main pole and the other side shield.

18 Claims, 25 Drawing Sheets

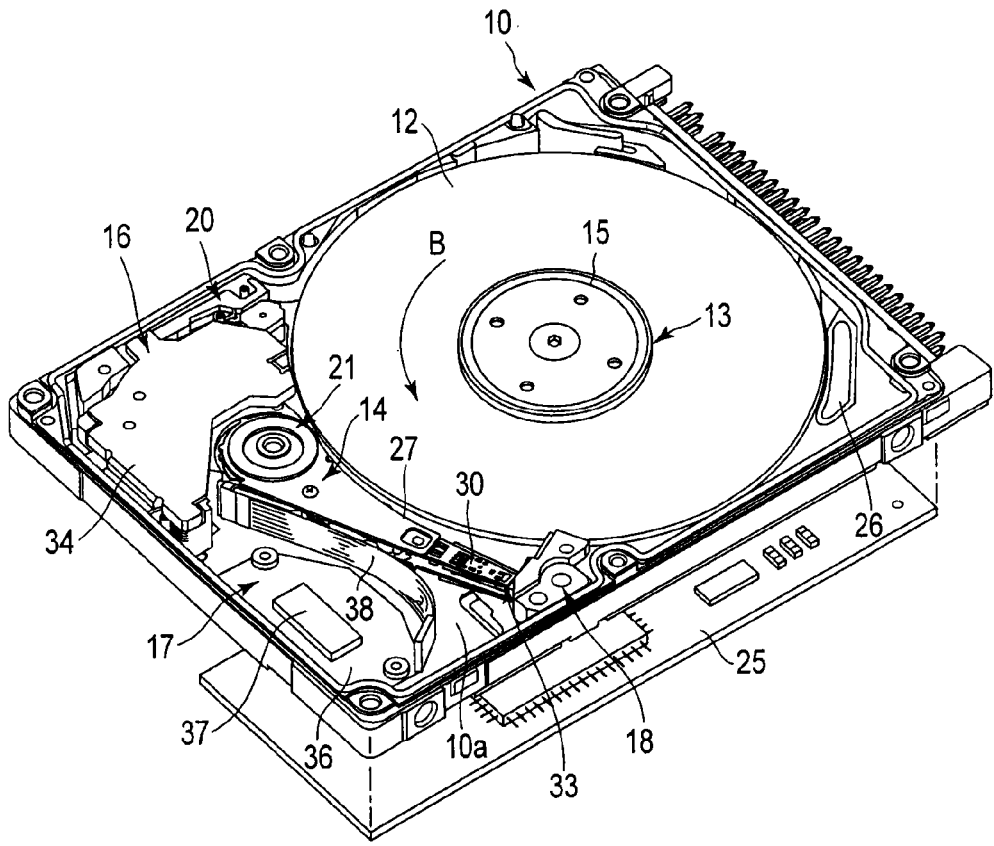
F I G. 1
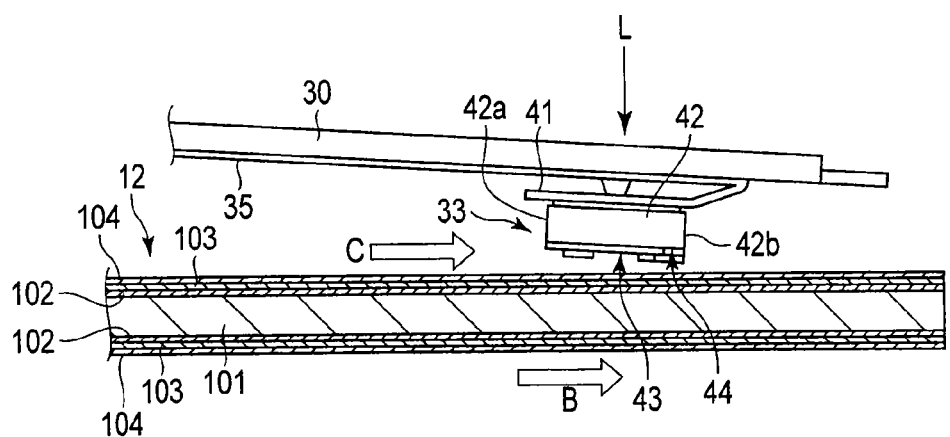
F I G. 2

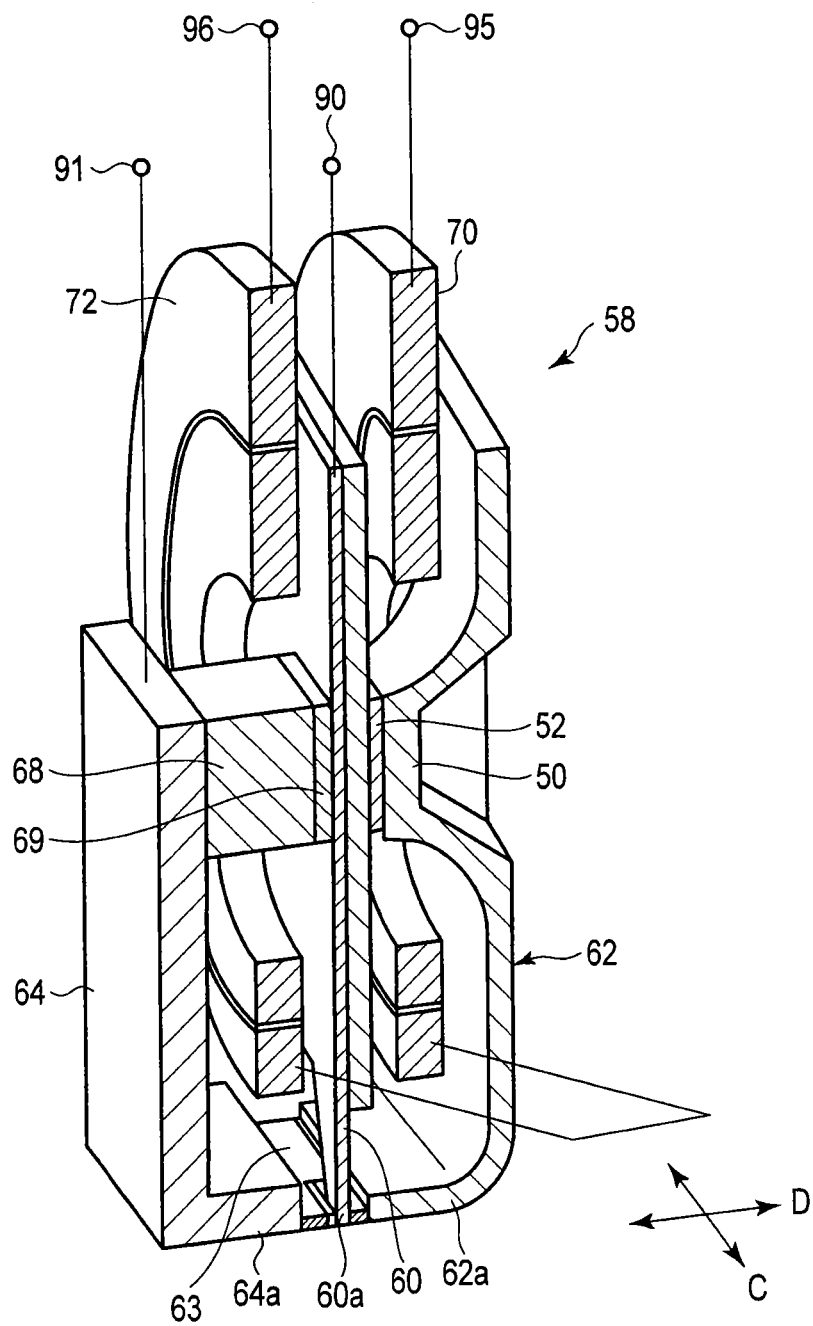
F I G. 4

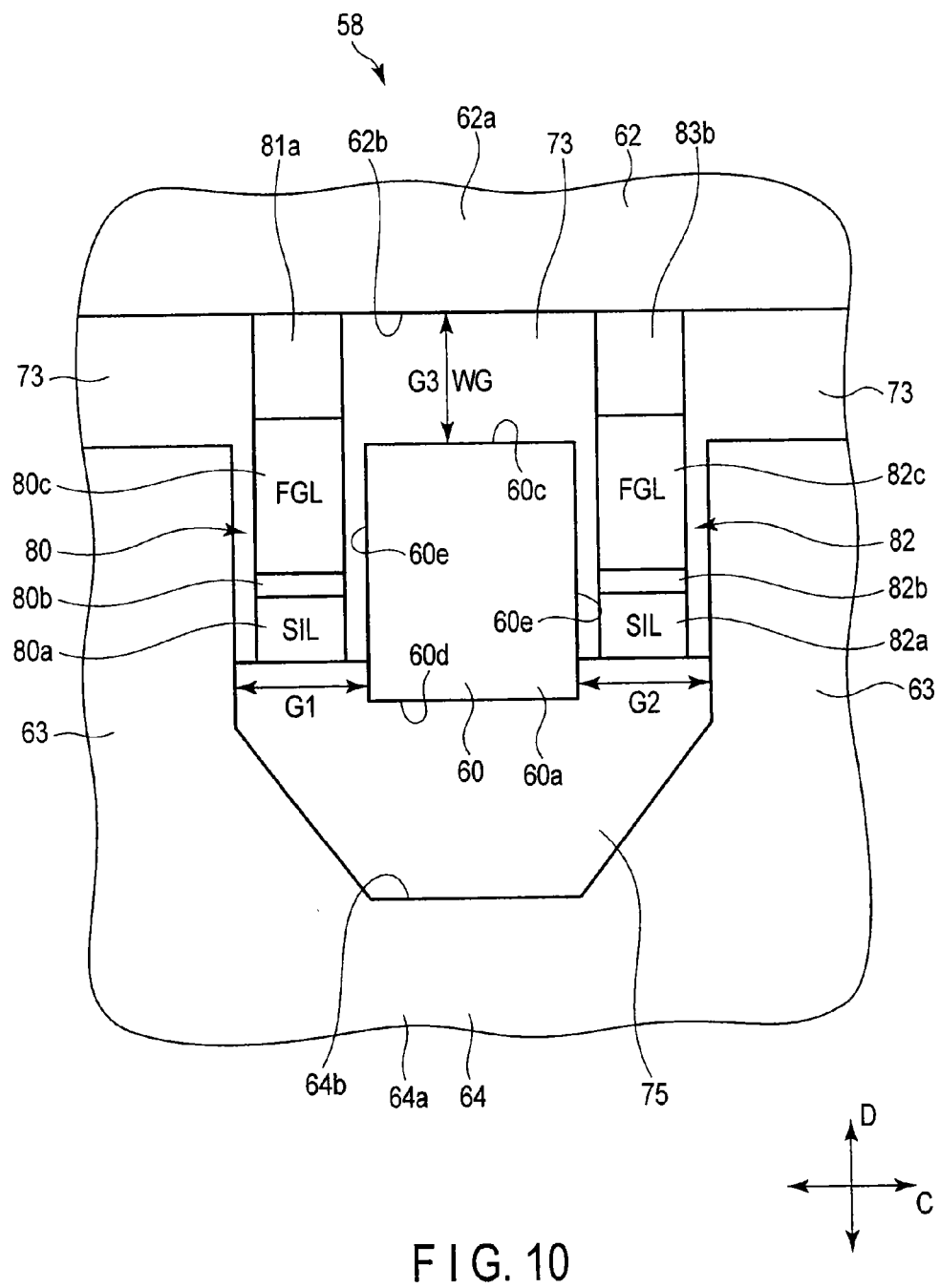
F I G. 10

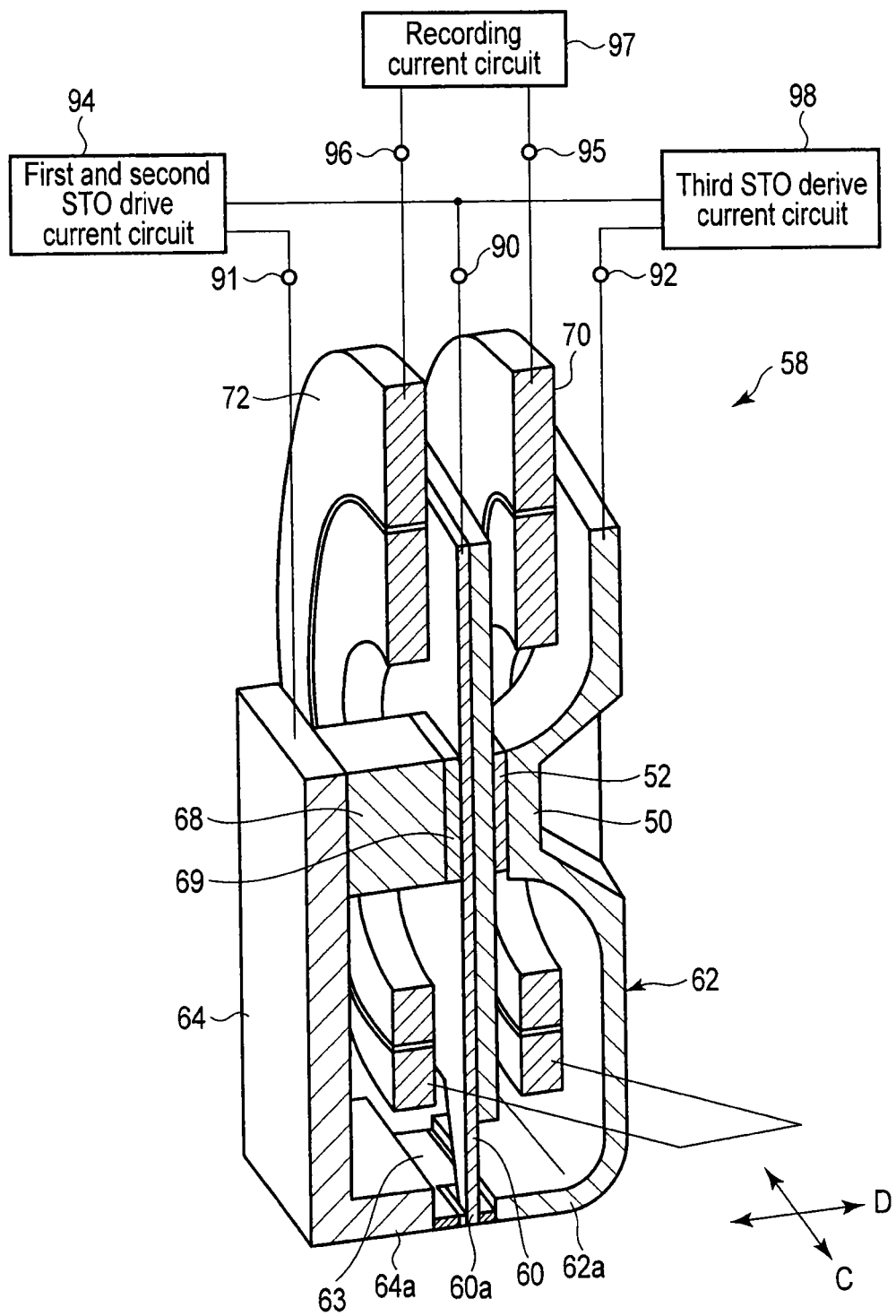
F I G. 11

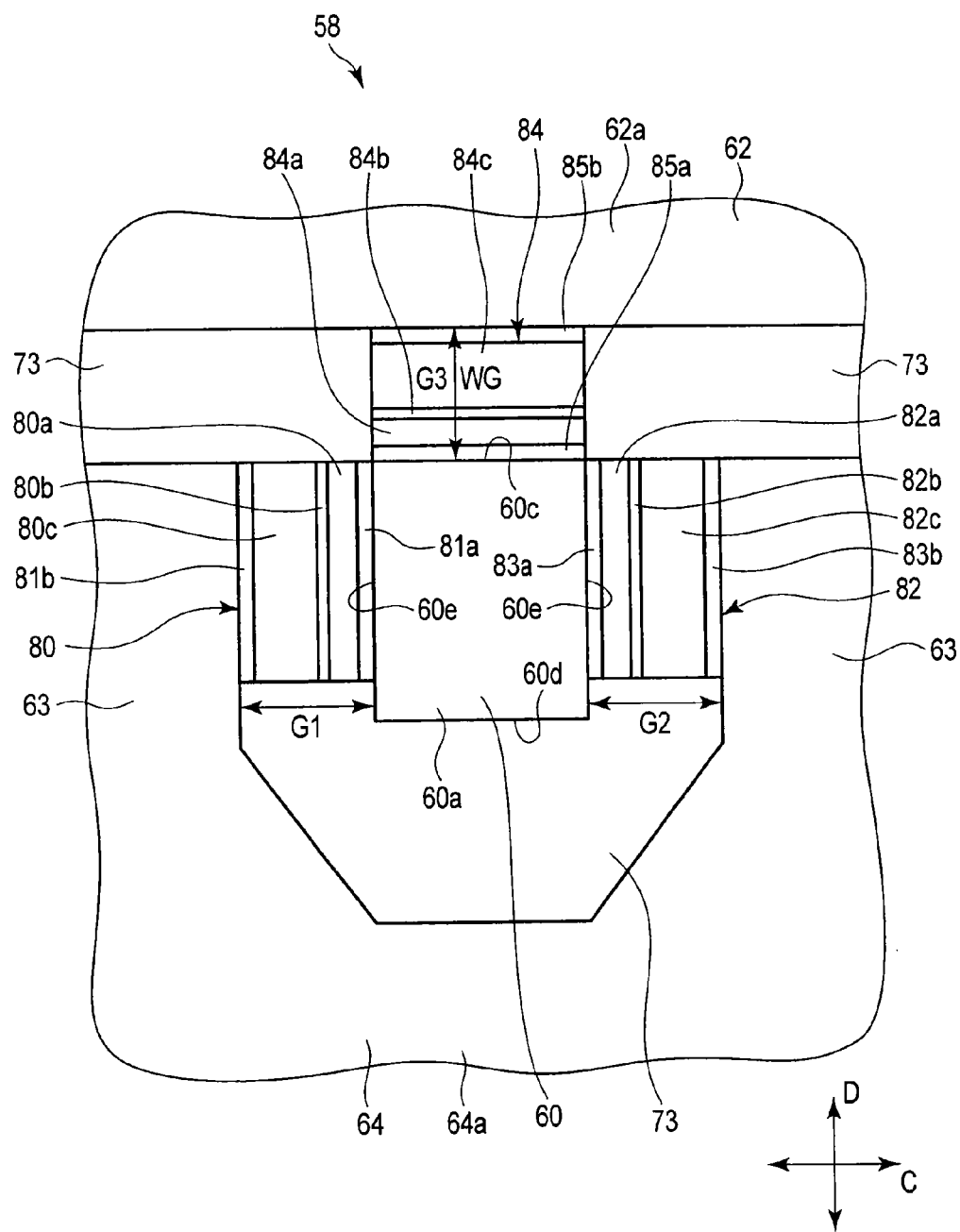
F I G. 12

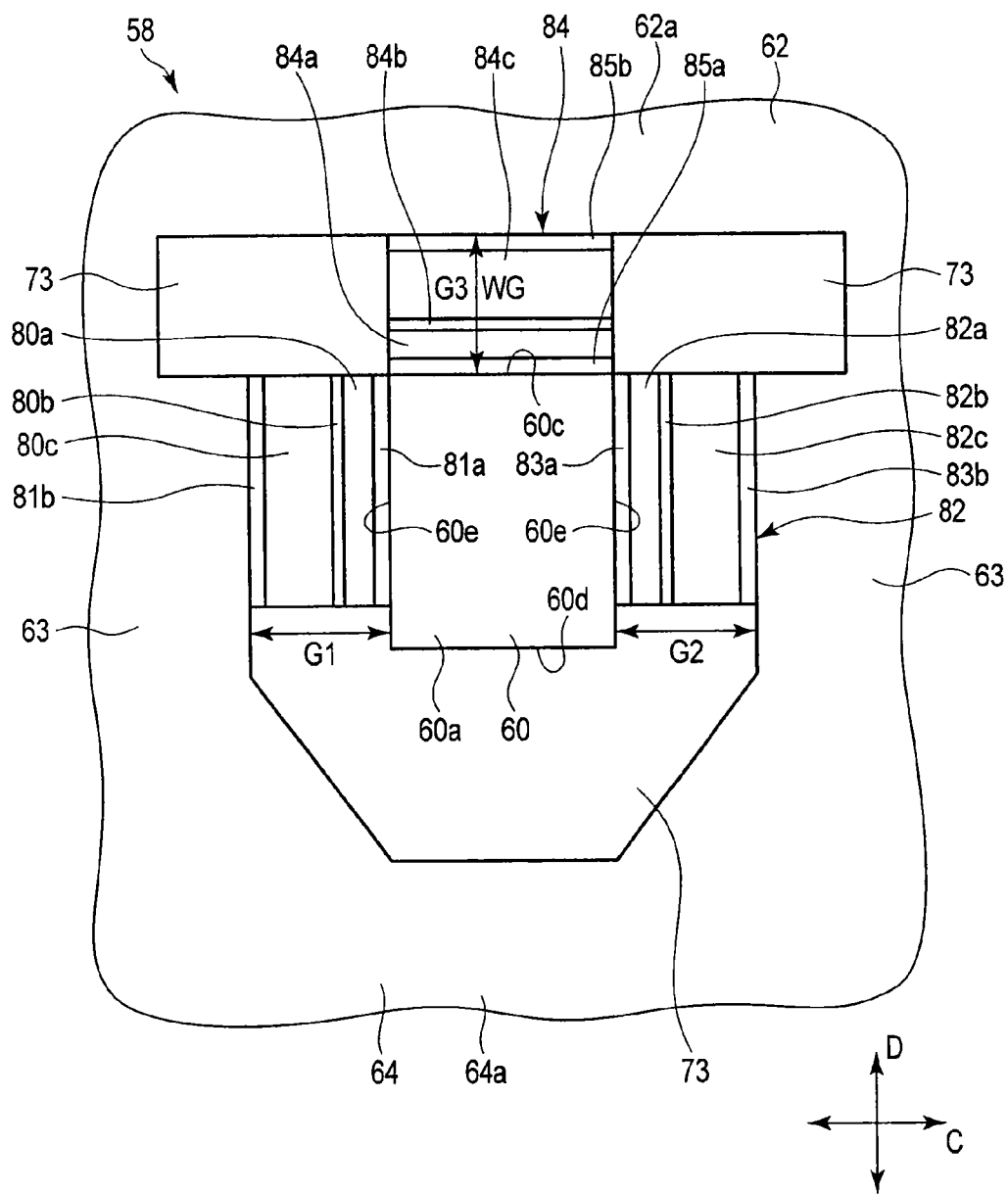
F I G. 19

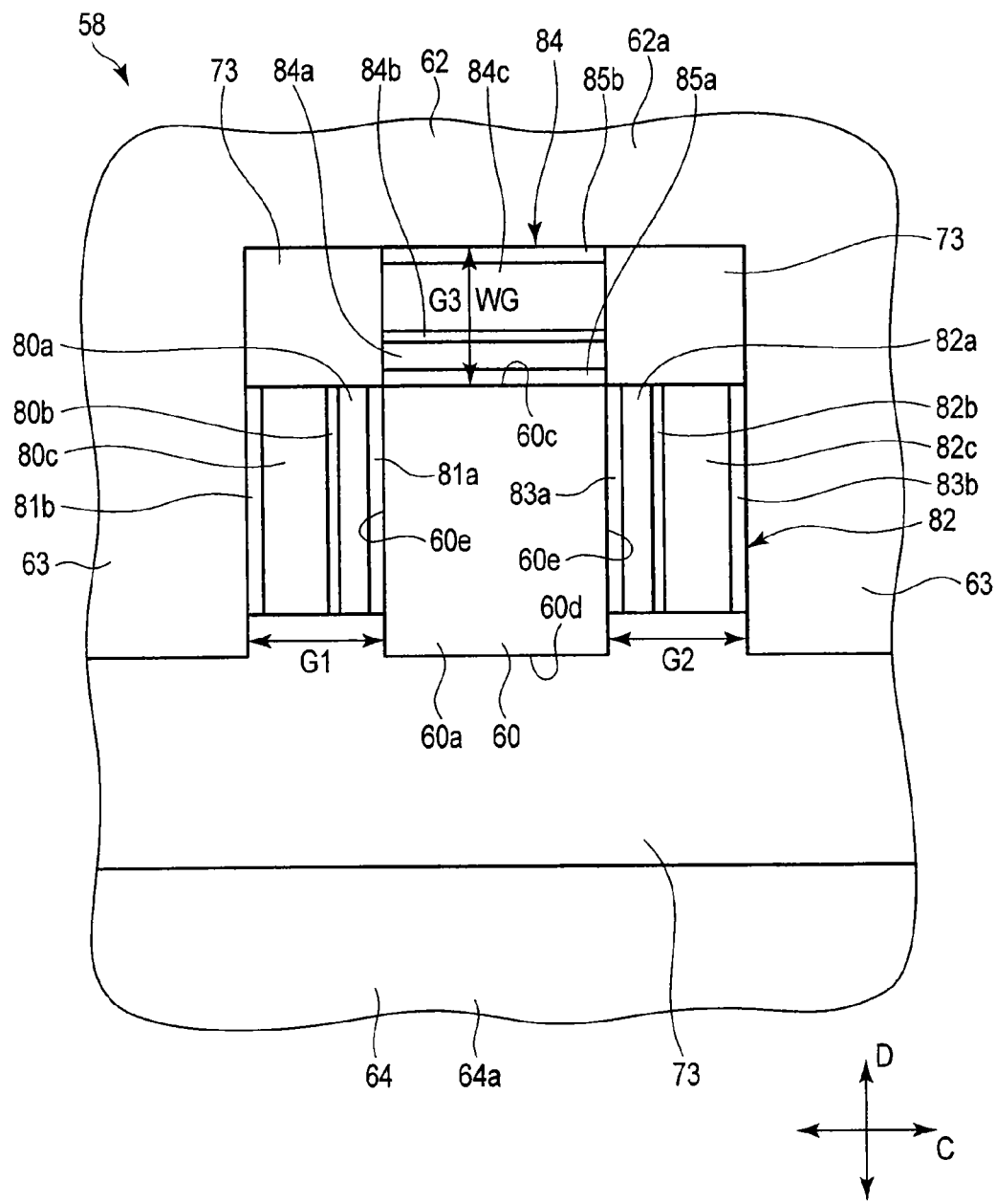
F I G. 20

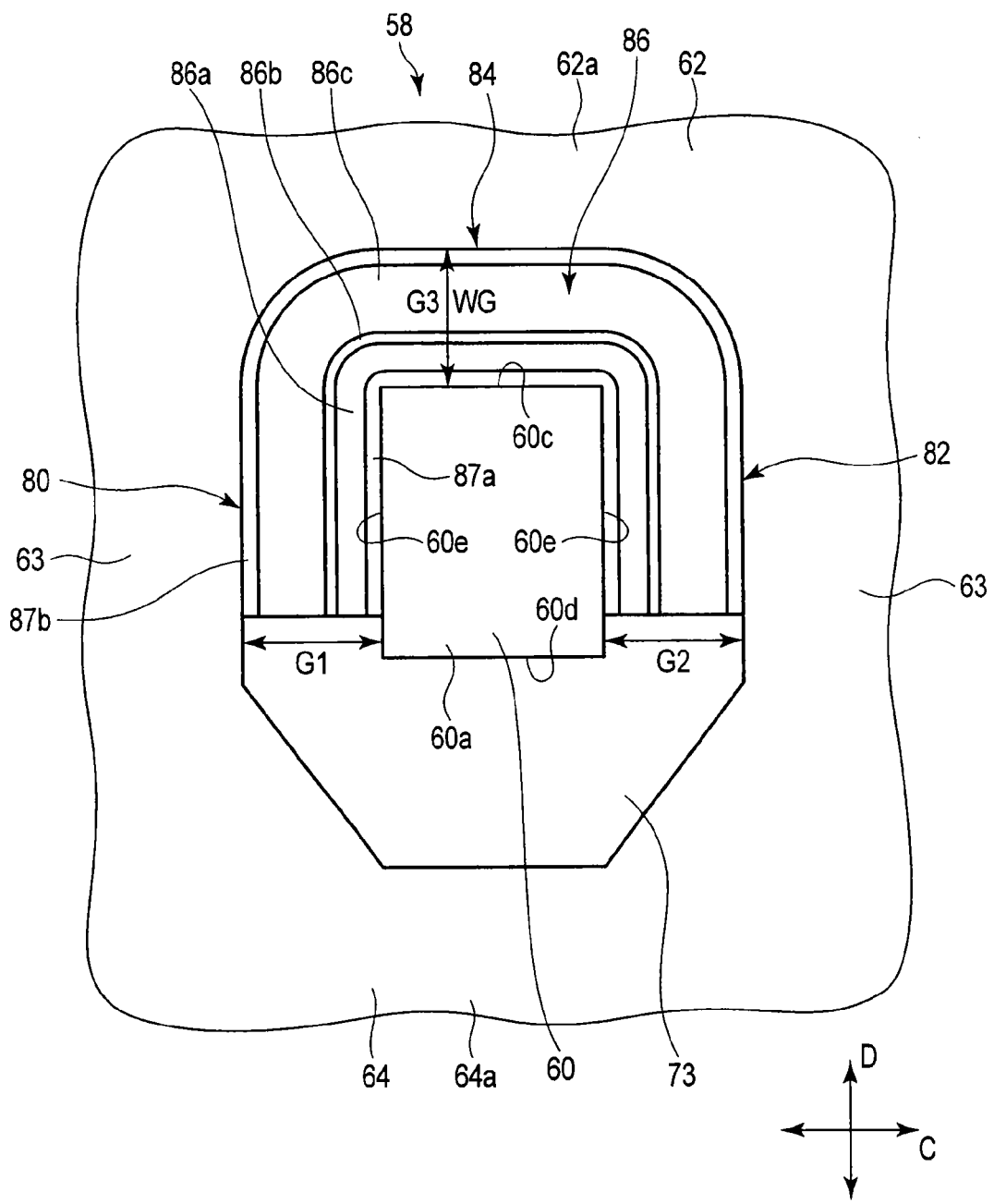
F I G. 25

MAGNETIC RECORDING HEAD AND DISK DEVICE WITH THE SAME

CROSS-REFERENCE TO RELATED APPLICATIONS

This application claims the benefit of U.S. Provisional Application No. 61/864,195, filed Aug. 9, 2013, the entire contents of which are incorporated herein by reference.

FIELD

Embodiments described herein relate generally to a magnetic recording head for use in a disk device for high-frequency assist recording, and a disk device with the magnetic recording head.

BACKGROUND

A magnetic disk device as an example of a disk device incorporates a magnetic disk in a housing, a rotary spindle motor supporting and rotating the magnetic disk, a magnetic head for reading/writing data from/to the magnetic disk, and a carriage assembly supporting the magnetic head so that the head can move relative to the magnetic disk. The head section of the magnetic head includes a magnetic recording head for writing and a reproducing head for reading.

To increase the recording density and capacity of a magnetic disk device or reduce its size, magnetic heads for perpendicular magnetic recording have recently been proposed. In one such magnetic head, a recording head comprises a main pole configured to produce a perpendicular magnetic field, a write shield pole, and a coil. The write shield pole is located on the trailing side of the main pole with a write gap therebetween and configured to close a magnetic path that leads to a magnetic disk. The coil serves to apply a magnetic flux to the main pole.

In a conventional recording head and magnetic recording device for imbricate recording, an increase in the intensity of the recording magnetic field applied to a recording medium is realized by increasing the width of the main pole compared to the recording track pitch, thereby enabling recording on the medium with a greater coercive force. Further, since the magnetic recording head has a structure of a main pole, a trailing shield TS, a leading shield LS and side shields SS, the gradients of the recording magnetic field in both a down-track direction and a cross-track direction can be increased. As a result, the recording densities in the down-track direction and cross-track direction can be increased to thereby increase a surface recording density.

A magnetic recording head for high-frequency assist recording, which includes a spin-torque oscillator provided as a high-frequency oscillator between the main pole and the write shield (i.e., in the write gap), has also been proposed. Also in this magnetic recording head for high-frequency assist recording spin-torque oscillator, the recording magnetic field and the high-frequency magnetic field can be increased in intensity by increasing the width (cross-track directional width), thereby enabling recording on a recording medium with a greater coercive force. In this case, however, the gradient of the high-frequency magnetic field in the cross-track direction is small, which makes it difficult to increase the recording density in the cross-track direction.

BRIEF DESCRIPTION OF THE DRAWINGS

FIG. 1 is an exemplary perspective view illustrating a hard disk drive (HDD) according to a first embodiment;

FIG. 2 is an exemplary side view illustrating a magnetic head and a suspension incorporated in the HDD;

FIG. 4 is an exemplary schematic perspective view of the recording head of the magnetic head, partly in section taken along the track center of the magnetic head;

FIG. 10 is an exemplary plan view, viewed from the ABS side, showing the distal end of a magnetic recording head incorporated in an HDD according to a third embodiment;

FIG. 11 is an exemplary schematic perspective view of a magnetic head incorporated in an HDD according to a fourth embodiment, partly in section taken along the track center of the magnetic head;

FIG. 12 is an exemplary plan view, viewed from the ABS side, showing the distal end of the magnetic recording head of the HDD according to the fourth embodiment;

FIG. 19 is an exemplary plan view, viewed from the ABS side, showing the distal end of the magnetic recording head of the HDD according to the sixth embodiment;

FIG. 20 is an exemplary plan view, viewed from the ABS side, showing the distal end of a magnetic recording head incorporated in an HDD according to a first modification;

FIG. 25 is an exemplary plan view, viewed from the ABS side, showing the distal end of a magnetic recording head incorporated in an HDD according to a second modification.

DETAILED DESCRIPTION

Figure 3:
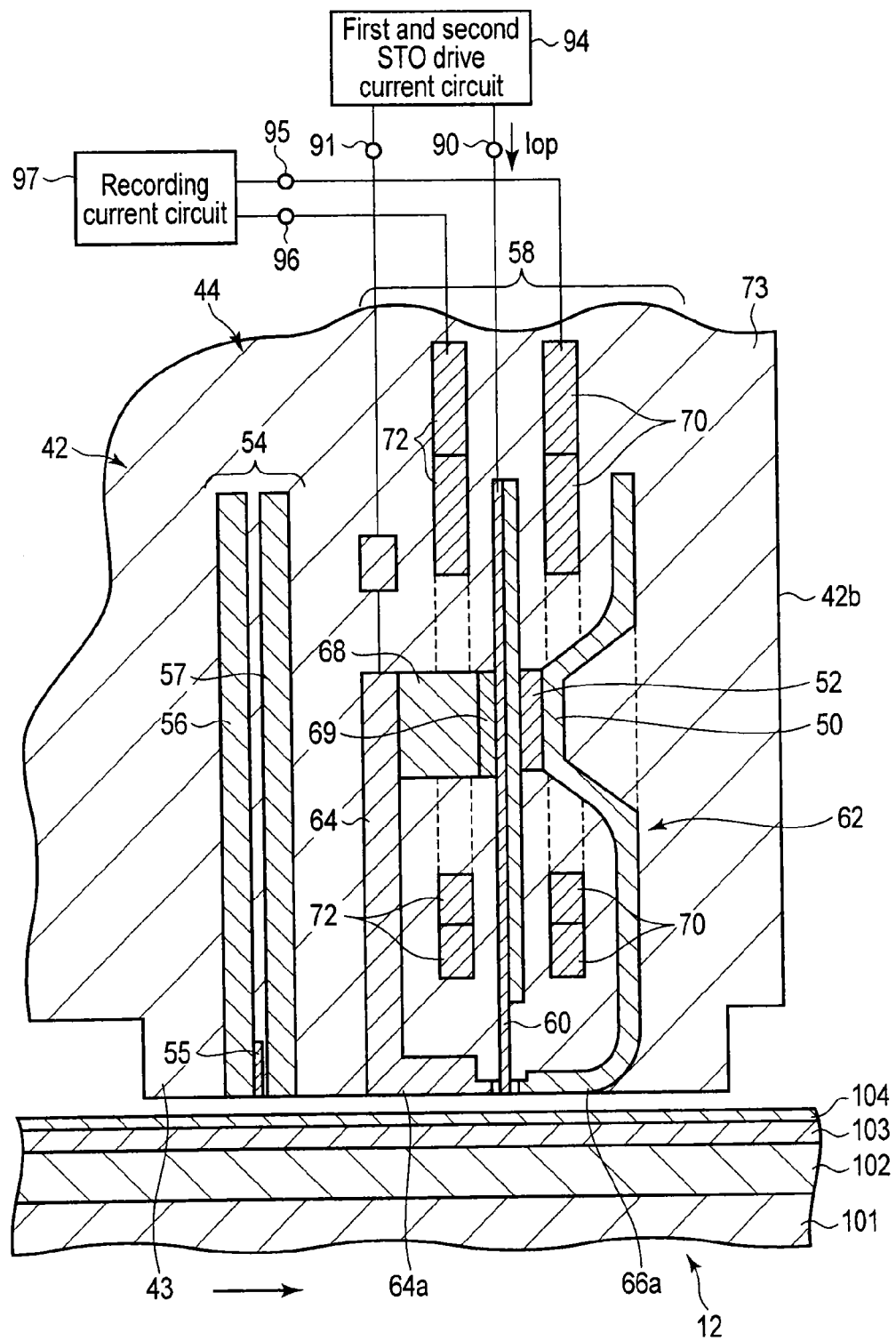
FIG. 3 is an exemplary enlarged cross-sectional view illustrating the head section of the magnetic head.

Various embodiments will be described hereinafter with reference to the accompanying drawings. In general, according to one embodiment, there is provided a magnetic head including: a main pole configured to apply a recording magnetic field to a recording layer included in a recording medium; a trailing shield opposing the main pole in a down-track direction, with a write gap interposed therebetween; a pair of side shields opposing the main pole on opposite sides of the main pole in a cross-track direction, with respective gaps interposed therebetween; a recording coil configured to cause the main pole to generate a magnetic field; a first high-frequency oscillator interposed between the main pole and one of the side shields; and a second high-frequency oscillator interposed between the main pole and the other side shield.

First Embodiment

FIG. 1 shows the internal structure of an HDD according to a first embodiment, assumed when its top cover is removed. FIG. 2 shows a magnetic head in a floating state. As shown in FIG. 1, the HDD comprises a housing 10. This housing 10 comprises an open-topped rectangular box-shaped base 10a and a non-illustrated rectangular plate-shaped top cover. The top cover is screwed to the base with screws to close the upper end opening of the base. As a result, the inside of the housing 10 is air-tightly maintained and can communicate with the outside for ventilation through a breather filter 26 alone.

A magnetic disk 12 as a recording medium and a mechanical section are provided on the base 10a. The mechanical section comprises a spindle motor 13 that supports and rotates the magnetic disk 12, a plurality of (e.g., two) magnetic heads 33 that record and reproduce data on and from the magnetic disk 12, a head actuator 14 that supports these magnetic heads 33 for movement relative to the surfaces of the magnetic disk 12, and a voice coil motor (which will be referred to as a VCM hereinafter) 16 that angularly moves and positions the head actuator. Further, on the base 10a are provided a ramp loading mechanism 18 that holds the magnetic heads 33 in a position off the magnetic disk 12 when the magnetic heads 33 are moved to the outermost periphery of the magnetic disk 12, a latch mechanism 20 that holds the head actuator 14 in a retracted position if the HDD is jolted, for example, and a board unit 17 having electronic components, such as a conversion connector, mounted thereon.

A control circuit board 25 is attached to the outer surface of the base 10a by screws such that it faces the bottom of the base 10a. The control circuit board 25 controls the operations of the spindle motor 13, the VCM 16, and the magnetic heads 33 through the board unit 17.

In FIG. 1, a plurality of magnetic disks 12 may be coaxially fitted on the hub of the spindle motor 13, clamped by a clamp spring 15 screwed at the upper end of the hub, and thereby fixed to the hub. The magnetic disks 12 are rotated in the direction indicated by arrow B at a predetermined speed by the spindle motor 13 as a drive motor.

The head actuator 14 comprises a bearing portion 21 fixed on the bottom of the base 10a, and arms 27 extended from the bearing portion 21. These arms 27 are placed at predetermined intervals therebetween in parallel with the surfaces of the magnetic disk 12, and are extended in the same direction from the bearing portion 21. The head actuator 14 includes elastically deformable elongated plate-shaped suspensions 30. The suspensions 30 are each constituted of a leaf spring, and their respective proximal ends are fixed to ends of the arms 27 by spot welding or bonding such that the suspensions are extended therefrom. Alternatively, each suspension 30 may be formed integral with the corresponding arm 27 as one body. The magnetic head 33 is supported at the extended end of each suspension 30. The arms 27 and suspensions 30 constitute a head suspension, and the head suspension and the magnetic heads 33 constitute a head suspension assembly.

As shown in FIG. 2, each magnetic head 33 has a slider 42 formed into a substantially rectangular parallelepiped shape and a recording/reproducing head portion 44 provided at the outflow end (trailing end) of the slider. The magnetic heads 33 are fixed to gimbal springs 41 provided at the distal ends of the suspensions 30. A head load L heading for the surfaces of the magnetic disk 12 is applied to each magnetic head 33 by elasticity of the corresponding suspension 30. The two arms 27 are placed in parallel at a predetermined interval therebetween, and the suspensions 30 and the magnetic heads 33 attached to the arms 27 face the counterparts, with the magnetic disk 12 held therebetween.

Each magnetic head 33 is electrically connected to a later-described main flexible printed circuit board (hereinafter referred to as a main FPC) 38 through a relay flexible printed circuit board (hereinafter, a relay FPC) 35 fixed on the corresponding suspension 30 and arm 27.

As shown in FIG. 1, the board unit 17 has an FPC main body 36 formed of a flexible printed circuit board and a main FPC 38 extended from the FPC main body. The FPC main body 36 is fixed on the bottom surface of the base 10a. Electronic components including a conversion connector 37 and a head IC are mounted on the FPC main body 36. The extended end of the main FPC 38 is connected to the head actuator 14, and connected to the magnetic head 33 through each relay FPC 35.

The VCM 16 has a non-illustrated support frame extended from the bearing portion 21 in the opposite direction of the arm 27 and a non-illustrated voice coil supported by the support frame. Where the head actuator 14 and the base 10a are assembled, the voice coil is placed between a pair of yokes 34 fixed on the base 10a, and the voice coil, the yokes, and magnets fixed to the yokes constitute the VCM 16.

When the magnetic disk 12 is rotated and the voice coil of the VCM 16 is activated, the head actuator 14 angularly moves to thereby position the magnetic head 33 on a desired track on the magnetic disk 12. At this time, the magnetic head 33 is radially moved between an inner peripheral portion and an outer peripheral portion of the magnetic disk 12.

The structures of the magnetic head 12 and the magnetic head 33 will now be described in detail. FIG. 3 is an enlarged cross-sectional view showing the head portion 44 of the magnetic head 33 and the magnetic disk 12.

As shown in FIGS. 1 to 3, the magnetic disk 12 includes a circular board 101 having a diameter of, for example, 2.5 inches (6.35 cm) and formed of a non-magnetic material. On each surface of the board 101, a soft magnetic layer 102, a magnetic recording layer 103 and a protective film 104 are stacked in this order. The soft magnetic layer 102 serves as a foundation layer and exhibits a soft magnetic property. The magnetic recording layer 103 on the soft magnetic layer vertically exhibits a magnetic anisotropic property to the disk surface.

As shown in FIGS. 2 and 3, the magnetic head 33 is formed as a float type head, and has a slider 42 formed into a substantially rectangular parallelepiped shape, and a head portion 44 formed at an end of the slider on the outflow (trailing) side. The slider 42 is formed of, e.g., a sintered compact (AlTiC) of alumina and a titanium carbide. The head portion 44 has a laminated structure of films.

The slider 42 comprises a rectangular disk facing surface (an air bearing surface (ABS)) 43 facing one surface of the magnetic disk 12. The slider 42 floats due to an air flow C generated between the disk surface and the disk facing surface 43 when the magnetic disk 12 rotates. The direction of the air flow C coincides with the rotation direction B of the magnetic disk 12. The slider 42 is arranged with respect to the surface of the magnetic disk 12 such that the elongated direction of the disk facing surface 43 is substantially aligned with the direction of the air flow C.

The slider 42 comprises a leading end 42a placed on the inflow side of the air flow C, and a trailing end 42b placed on the outflow side of the air flow C. A leading step, a trailing step, a side step, a negative pressure cavity, etc., which are not shown in the drawings, are formed at the disk facing surface 43 of the slider 42.

As shown in FIG. 3, the head portion 44 includes a reproducing head 54 and a recording head (magnetic recording head) 58 formed at the slider 42 in a thin-film process, and is formed as a separation type magnetic head. The reproducing head 54 and the recording head 58 are covered with a protective insulating film 73, except for the portions to be exposed at the disk facing surface 43 of the slider 42. The protective insulating film 73 provides the outline of the head portion 44.

The reproducing head 54 comprises a magnetic film 55 exhibiting a magneto-resistance effect, and shield films 56 and 57 arranged on the trailing side and the leading side of this magnetic film to sandwich the magnetic film 55. The lower ends of the shield films 56 and 57 are exposed at the disk facing surface 43 of the slider 42.

Figure 5:
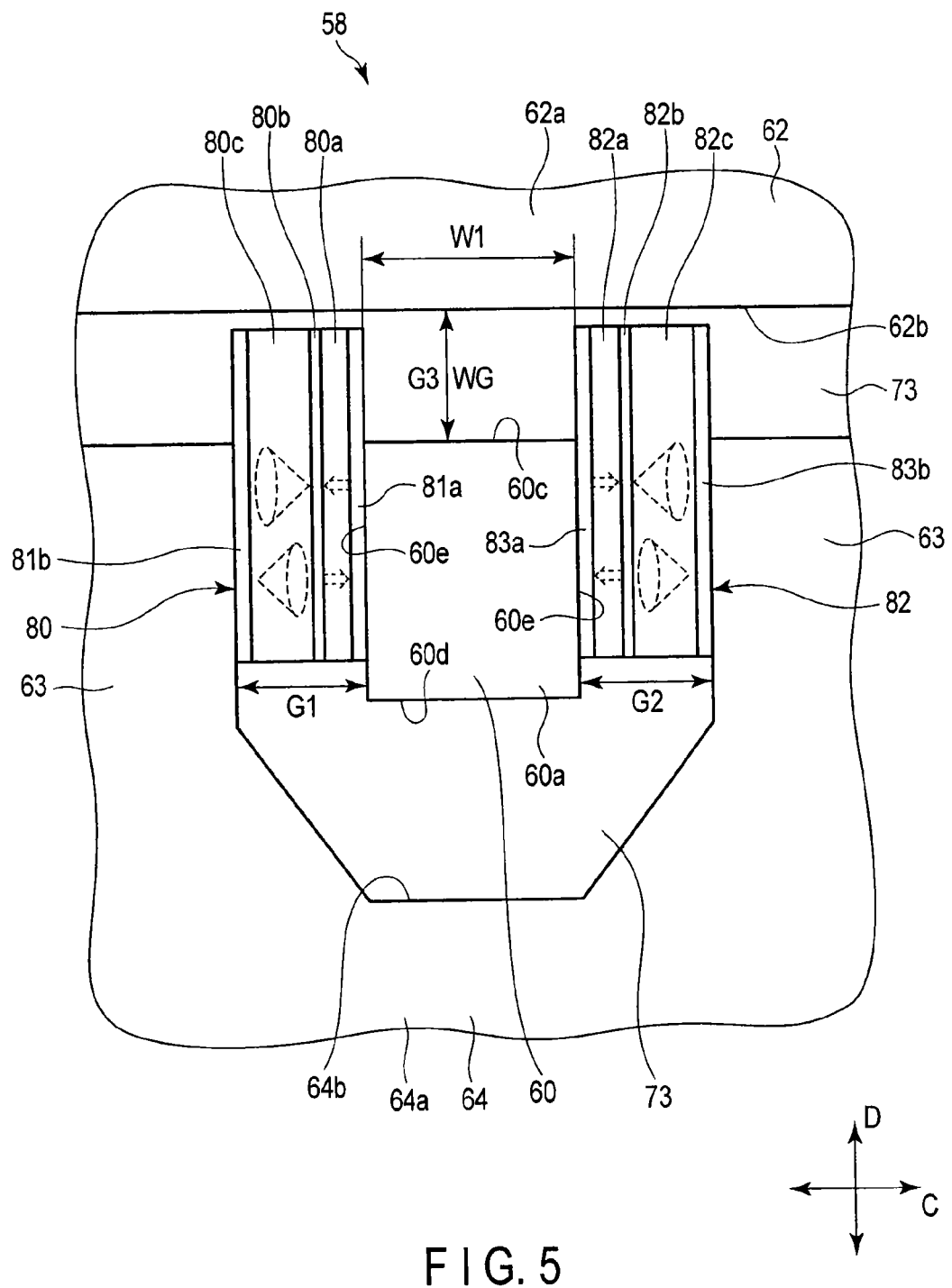
FIG. 5 is an exemplary plan view, viewed from an air bearing surface (ABS) side, showing the distal end of the magnetic recording head.

The recording head 58 is provided on the trailing end 42b side of the slider 42 with respect to the reproducing head 54. FIG. 4 is a schematic perspective view, partly in section taken along the track center on the magnetic disk 12, showing the magnetic recording head 58. FIG. 5 is a plan view, viewed from a disk facing surface (ABS) side, showing the end of the recording head close to the recording medium.

As shown in FIGS. 3 to 5, the recording head 58 comprises a main pole 60 formed of a high magnetic permeability material that causes a recording magnetic field perpendicular to the surface of the magnetic disk 12, a trailing shield 62, a pair of side shields 63 and a leading shield 64. The main pole 60 and the trailing shield 62 constitute a first magnetic core as a magnetic path. The main pole 60 and the leading shield 64 constitute a second magnetic core as another magnetic path. The recording head 58 further comprises a first coil 70 wound around the first magnetic core for applying a magnetic flux to the main pole 60, a second coil 72 wound around the second magnetic core, a first high-frequency oscillator, e.g., a first spin-torque oscillator (STO) 80, opposing the ABS 43, and a second high-frequency oscillator, e.g., a second spin-torque oscillator (STO) 82, opposing the ABS 43.

The main pole 60 substantially perpendicularly extends with respect to the surface of the magnetic disk 12 and the ABS 43. The end portion 60a of the main pole 60 on the magnetic disk 12 side is tapered toward the ABS 43. The end portion 60a of the main pole 60 has a trailing side end surface 60c located on the trailing end side and having a predetermined width (track width), a leading side end surface 60d opposing the trailing side end surface, and opposite side surfaces 60e. The end surface of the main pole 60 is exposed at the disk facing surface 43 of the slider 42. The width W1 of trailing side end surface 62c of the end portion 60a is substantially the same as the track width (in the cross-track direction C) of the magnetic disk 12.

The trailing shield 62 formed of a soft magnetic material having high saturation magnetic density is provided on the trailing side of the main pole 60 to effectively close the magnetic path via the soft magnetic layer 102 just below the main pole. The trailing shield 62 is substantially L-shaped, and includes a first connection 50 connected to the main pole 60. The first connection 50 is connected via a nonconductive material 52 to the upper portion of the main pole 60, i.e., an upper portion (back gap) apart from the disk facing surface 43.

An end portion 62a of the trailing shield 62 is formed into an elongated rectangular shape. The end surface of the trailing shield 62 is exposed at the disk facing surface 43 of the slider 42. The leading side end surface 62b of the end portion 62a extends along the track width of the magnetic disk 12 (in the cross-track direction C). The leading side end surface 62b faces the trailing side end surface 60c of the main pole 60 in parallel, with a write gap WG (i.e., the gap length in the down-track direction D) defined therebetween.

For instance, the first coil 70 is wound around the first connection 50 between the main pole 60 and the trailing shield 62.

The leading shield 64 formed of a soft magnetic material faces the main pole 60 on the leading side of the pole. The leading shield 64 is substantially L-shaped, and the end portion 64a of the leading shield 64 on the magnetic disk 12 side is of an elongated rectangular shape. The lower surface of the end portion 64a is exposed to the disk facing surface 43 of the slider 42. The trailing side surface 64b of the end portion 64a extends along the track width of the magnetic disk 12. The trailing side surface 64b faces the leading side end surface 60d of the main pole 60 in parallel, with a gap defined therebetween. In this gap, a protective insulating film as a nonmagnetic material, described later, is located.

The leading shield 64 has a first connection 68 connected to the main pole 60 via a non-conductive material (insulator) 69 at a position (back gap) apart from the magnetic disk 12. The first connection 68 is formed of, for example, a soft magnetic material, and provides a magnetic circuit along with the main pole 60 and the leading shield 64. Further, at the first connection 68, the main pole 60 and the leading shield 64 are electrically isolated by the insulator 69. Although in the embodiment, the leading shield 64 is extended from the ABS 43 to the back gap, it may be provided only in the vicinity of the ABS 43.

In the first embodiment, the pair of side shields 63 are formed integral with the leading shield 64 as one body by means of a soft magnetic material, and extend from the leading shield 64 toward the trailing shield 62. The side shields 63 are physically separate from the main pole 60 and extend along the track width of the main pole 60. Further, the side shields 63 are magnetically and electrically connected to the leading shield 64. The side shields 63 face the side surfaces 60e of the main pole 60 with gaps G1 and G2 interposed therebetween. End surfaces of the side shields 63 are exposed to the ABS 43. The gaps G1 and G2 between the side surfaces 60e and the side shields 63 are set substantially equal to the gap length G3 of the write gap WG.

As shown in FIG. 5, a protective insulation film 73 formed of an insulator, such as alumina or silicon oxide, is provided in the gap between the main pole 60 and the end portion 62a of the trailing shield 62, and in the gap between the main pole 60 and the leading shield 64.

As shown in FIGS. 2 and 3, the second coil 72 is wound around the magnetic circuit including the main pole 60 and the leading shield 64 to apply a magnetic field to the magnetic circuit. For instance, the second coil 72 is wound around the first connection 68 between the main pole 60 and the leading shield 64.

The second coil 72 is wound in the direction opposite to that of the winding of the first coil 70. The first and second coils 70 and 72 are connected to terminals 95 and 96, respectively. The terminals 95 and 96 are connected to a recording current circuit (second power supply) 97. Further, the second coil 72 is connected to the first coil 70 in series. Alternatively, respective currents may be supplied to the first and second coils 70 and 72 to control them independently. The current supplied to the first and second coils 70 and 72 is controlled by the controller of the HDD. When data is written to the magnetic disk 12, a predetermined current is supplied to the first and second coils 70 and 72 to cause the main pole 60 to generate a magnetic flux.

In the above-described recording head 58, the soft magnetic material providing the main pole 60, the trailing shield 62, the leading shield 64 and the side shields 63 may be formed of an alloy or compound containing at least Fe, Co or Ni.

As shown in FIG. 5, the first spin-torque oscillator (first STO) 80 is provided in the gap G1 defined between the main pole 60 and one of the side shields 63, and the second spin-torque oscillator (second STO) 82 is provided in the gap G2 defined between the main pole 60 and the other side shield 63.

The first STO 80 comprises a spin-injection layer (SIL) 80a, an intermediate layer 80b and an oscillation layer (FGL) 80c stacked in this order from the main pole 60 toward the one side shield 63. A first electrode layer 81a is provided between the main pole 60 and the spin-injection layer 80a of the first STO 80 so as to distribute power to the main pole 60, the first STO 80 and the one side shield 63 in this order. Similarly, a second electrode layer 81b is provided between the oscillation layer 80c of the first STO 80 and the one side shield 63. The main pole 60, the first STO 80, the one side shield 63 and the leading shield 64 provide a power distribution circuit for distributing power to the first STO 80. In the first embodiment, the first STO 80 extends over the main pole 60 to a position near the trailing shield 62.

The second STO 82 comprises a spin-injection layer (SIL) 82a, an intermediate layer 82b and an oscillation layer (FGL) 82c stacked in this order from the main pole 60 toward the other side shield 63. A first electrode layer 83a is provided between the main pole 60 and the spin-injection layer 82a of the second STO 82 so as to distribute power to the main pole 60, the second STO 82 and the other side shield 63 in this order. Similarly, a second electrode layer 83b is provided between the oscillation layer 82c of the second STO 82 and the other side shield 63. The main pole 60, the second STO 82, the other side shield 63 and the leading shield 64 provide a power distribution circuit for distributing power to the second STO 82. In the first embodiment, the second STO 82 extends over the main pole 60 to a position near the trailing shield 62.

As shown in FIGS. 3 and 4, terminals 90 and 91 are connected to the main pole 60 and the leading shield 64, respectively, and are also connected to a drive current circuit (power supply) 94 for driving the first and second STOs. A drive current Iop for driving the first STO 80 can be made to flow in series from the drive current circuit 94 through the first STO 80, the side shield 63 and the leading shield 64. Similarly, a drive current for driving the second STO 82 can be made to flow in series from the drive current circuit 94 through the second STO 82, the side shield 63 and the leading shield 64. Alternatively, different STO drive current circuits may be provided for the first and second STOs.

As shown in FIG. 5, the first and second STOs 80 and 82 are formed equal to each other in size, film thickness and material of the spin-torque oscillator. For instance, the film thickness of the oscillation layer (FGL) is set to 15 nm, Bs is set to 2.0 T, the film thickness of the spin-injection layer (SIL) is set to 6 nm, the vertical magnetic anisotropy Hk=13 kOe, and vertical coercive force Hc=4 kOe.

The width (i.e., the size in the down-track direction D) of the oscillator layers 80c and 82c is set to 50 nm, and their vertical size from the ABS 43 is set to 17 nm. The distance between the oscillation layers (FGL) 80c and 82c and the main pole 60 is set to 10 nm. The oscillation layers (FGL) 80c and 82c are formed of, for example, an FeCo alloy, and the spin-injection layers 80a and 82a are formed of, for example, a Co/Pt artificial lattice. The intermediate layers 80b and 82b are formed of, for example, Cu. Alternatively, the oscillation layers and the spin-injection layers may be formed of an alloy containing at least Fe, Co and/or Ni, a Co/Ni artificial lattice, an Fe/Co artificial lattice, a Co/Pd artificial lattice, an FeCo/Ni artificial lattice, a Whistler alloy such as CoFeMnGe or CoFeMnSi, or a laminated structure of some of the above-mentioned materials.

The distance (G3) between the main pole 60 and the trailing shield 62 is substantially equal to the distance (G1, G2) between the main pole 60 and each side shield 63. The write gap magnetic field between the main pole 60 and the trailing shield 62 is substantially equal to that between the main pole 60 and each side shield 63, and is, for example, 8 kOe. As a result, the first and second STOs 80 and 82 operate or oscillate under substantially the same condition, thereby enabling efficiently superposed high-frequency magnetic fields to be applied to the magnetic disk 12. This leads to increases in high-frequency field intensity and in surface recording density.

Further, the write gap magnetic field and side gap magnetic field are sufficiently greater than the magnetic field Hc (=4 kOe) of the oscillation layers 80c and 82c. Accordingly, when the recording polarity has changed, the direction of magnetization of the oscillation layers 80c and 82c is inverted to the direction of magnetization of the write gap magnetic field and side gap magnetic field.

Although in the first embodiment, the spin-injection layers 80a and 82a of the first and second STOs are provided closer to the main pole 60 than the oscillation layers 80c and 82c, respectively, they may be provided remoter from the main pole 60 than the respective oscillation layers. Through thus improving the magnetic characteristic and spin-torque characteristic of the spin-injection layers and oscillation layers, the high-frequency magnetic field intensities of the first and second STOs can be increased to thereby enhance the surface recording density.

The order of stacking of the layers may differ between the first and second STOs 80 and 82. Through thus improving the magnetic characteristic and spin-torque characteristic of the spin-injection layer and oscillation layer of each STO, the high-frequency field intensity of each STO can be increased to thereby enhance the surface recording density.

Although in the first embodiment, the first and second STOs 80 and 82 are made substantially equal in film thickness and material, the invention is not limited to this. In order to improve the oscillation characteristic of each STO, the STOs may have different sizes or film thicknesses, or be formed of different materials. This enables the high-frequency magnetic field intensities of the first and second STOs 80 and 82 to be increased to thereby enhance the surface recording density.

The trailing side end surface 60c of the main pole 60 facing the trailing shield 62 is perpendicular on the ABS 43 to the side surfaces 60e of the main pole 60 facing the side shields 63. In accordance with the angle formed between the down-track direction D of the magnetic recording/reproducing apparatus and the normal line of the trailing side end surface 60c of the main pole 60, an acute or obtuse angle may be formed between the trailing side end surface 60c and each side surface 60e of the main pole 60 on the ABS 43. As a result, the recording density in the cross-track direction C can be increased to thereby enhance the surface recording density.

It is desirable that the normal line of the side surface 60e of the main pole 60 be substantially parallel to the layer-stacked direction of the first or second STO 80 or 82 arranged in contact with the side surface 60e. The recording magnetic field gradient in the cross-track direction C is maximum when it is parallel to the normal line of the side surface 60e. Further, the magnetic field gradient of the circularly polarized magnetic field is maximum in the layer stacked direction. Accordingly, by setting the layer-stacked direction of the first or second STO 80 or 82 parallel to the normal line of the side surface 60e, the recording density in the cross-track direction C is increased to thereby increase the surface recording density.

As shown in FIGS. 3 to 5, when first and second STO drive currents are supplied from the first and second STO drive current circuit 94 to the first and second STOs 80 and 82, and a recording current is supplied from the recording current circuit 97 to the first and second coils 70 and 72, the first and second STOs 80 and 82 oscillate. Since the write gap magnetic field and side gap magnetic field are sufficiently greater than the magnetic fields Hc (=4 kOe) of the spin-injection layers 80a and 82a of the first and second STOs 80 and 82, the direction of magnetization of the spin-injection layers is inverted to the direction of magnetization of the write gap magnetic field and side gap magnetic field when the recording polarity has changed. Thus, regardless of whether the recording polarity is positive or negative, a high-frequency magnetic field of a constant oscillation frequency can be generated by supplying direct currents as the first and second STO drive currents. In the first embodiment, the first and second STOs 80 and 82 are set to substantially the same oscillation frequency.

Alternatively, the first and second STO drive currents may be set independently of each other. In this case, the oscillation of each STO is stabilized. The STOs oscillate with their appropriate frequencies. As a result, the high-frequency field intensity is increased to thereby increase the recording density in the cross-track direction C and hence the surface recording density.

The first and/or second STO drive current may be obtained by superposing, upon a DC component, a component that varies in synchronism with a recording current. By virtue of this superposition, each STO oscillation frequency can be stabilized when a recording signal is switched, and frequency restoration can be performed quickly, whereby recording bit transition becomes definite to enable higher density recording.

Figure 6:
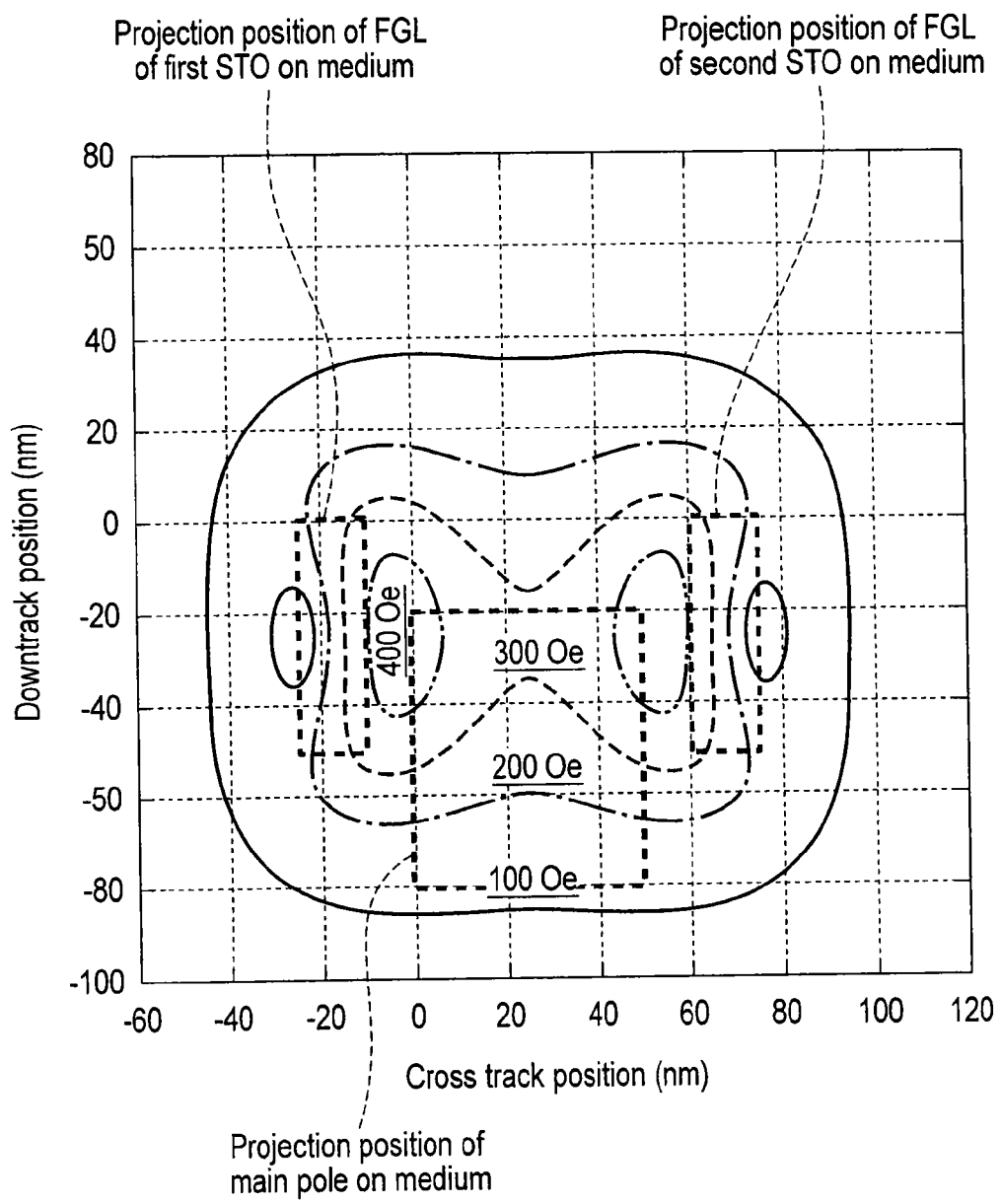
FIG. 6 is a graph, illustrating the distribution of the intensities of a high-frequency circularly polarized magnetic field generated on a magnetic disk (recording medium) by first and second STOs.

FIG. 6 shows a circularly polarized magnetic field intensity distribution of high frequency generated on a magnetic disk (recording medium) by the first and second STOs 80 and 82. This circularly polarized magnetic field includes a parallel component, and a circularly polarized component that is in a direction in which it assists magnetization inversion of the medium. The distance between the ABS 43 and the center of the magnetic disk is 20 nm.

The magnetization of the oscillation layers 80c and 82c oscillates about the magnetic flux generated by the main pole 60. Accordingly, the first STO 80 oscillates about an axis extending through the main pole 60 and the corresponding one of the side shields 63, while the second STO 82 oscillates about an axis extending through the main pole 60 and the other side shield 63. Further, the circularly polarized component for assisting magnetization inversion of the magnetic disk is unevenly distributed on the main pole 60 side of the oscillation layers 80c and 82c, and is greatly reduced on the opposite side of the main pole side. As a result, the circularly polarized magnetic fields generated by the first and second STOs 80 and 82 mutually reinforce each other to thereby generate a circularly polarized magnetic field with a maximum intensity of 450 (Oe) at the track center. The distribution of the intensities of this magnetic field is symmetrical in the cross-track direction. Further, when the first and second STOs 80 and 82 provided between the main pole 60 and the respective side shields 63 are used, the contour lines of the resultant magnetic field are precipitous, which increases the recording density.

In the first embodiment, the first and second STOs 80 and 82 extend over the main pole 60 to a position near the trailing shield 62. The maximum intensity values of the circularly polarized magnetic field are detected at the positions near the central portions of the first and second STOs 80 and 82. Further, the maximum intensity value of the recording magnetic field is detected in the trailing side end surface 60c of the main pole 60. Therefore, it is desirable that the centers of the first and second STOs 80 and 82 in the down-track direction be aligned with the trailing side end surface 60c of the main pole 60. In this case, the maximum value of the circularly polarized magnetic field generated by each STO can be superposed with that of the recording magnetic field generated by the main pole. As a result, magnetic recording of high holding power and high magnetic anisotropic energy can be realized to thereby increase the surface recording density.

Figure 7:
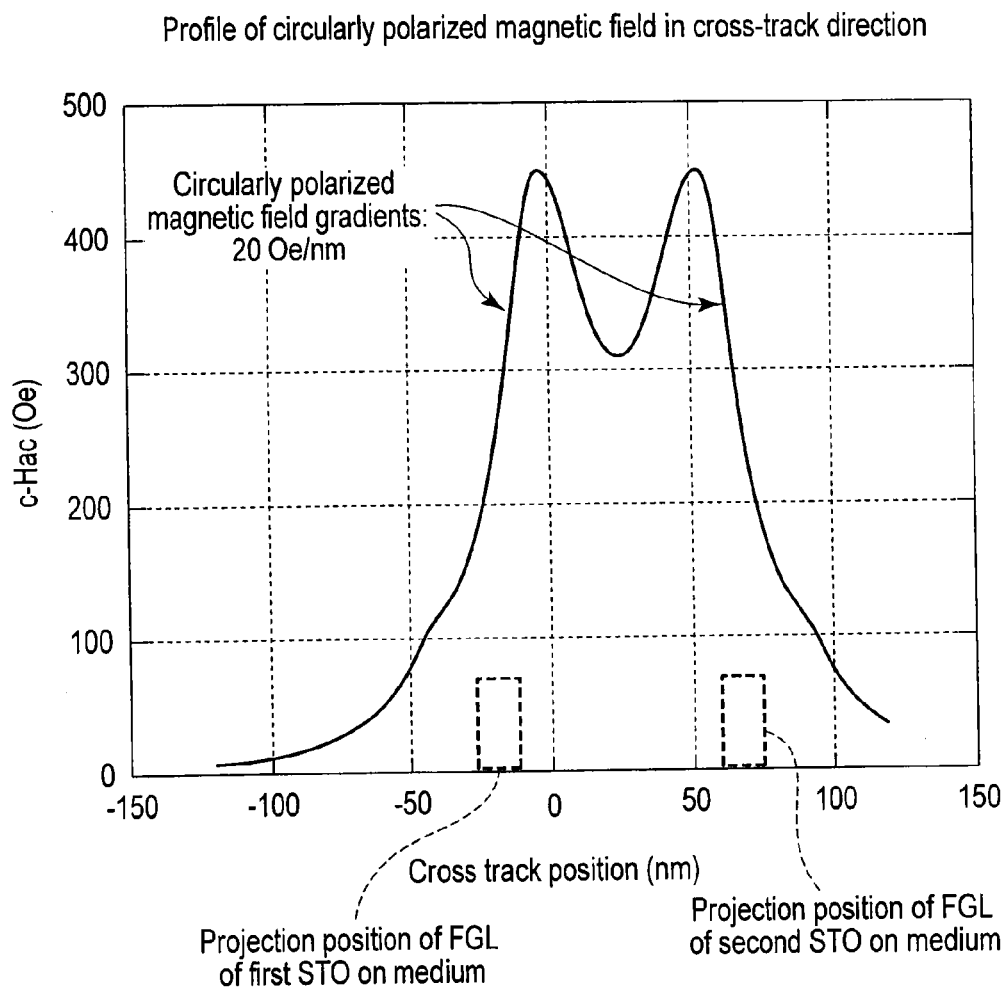
FIG. 7 is a graph illustrating the profile of the circularly polarized magnetic field in a cross-track direction C.
Figure 8:
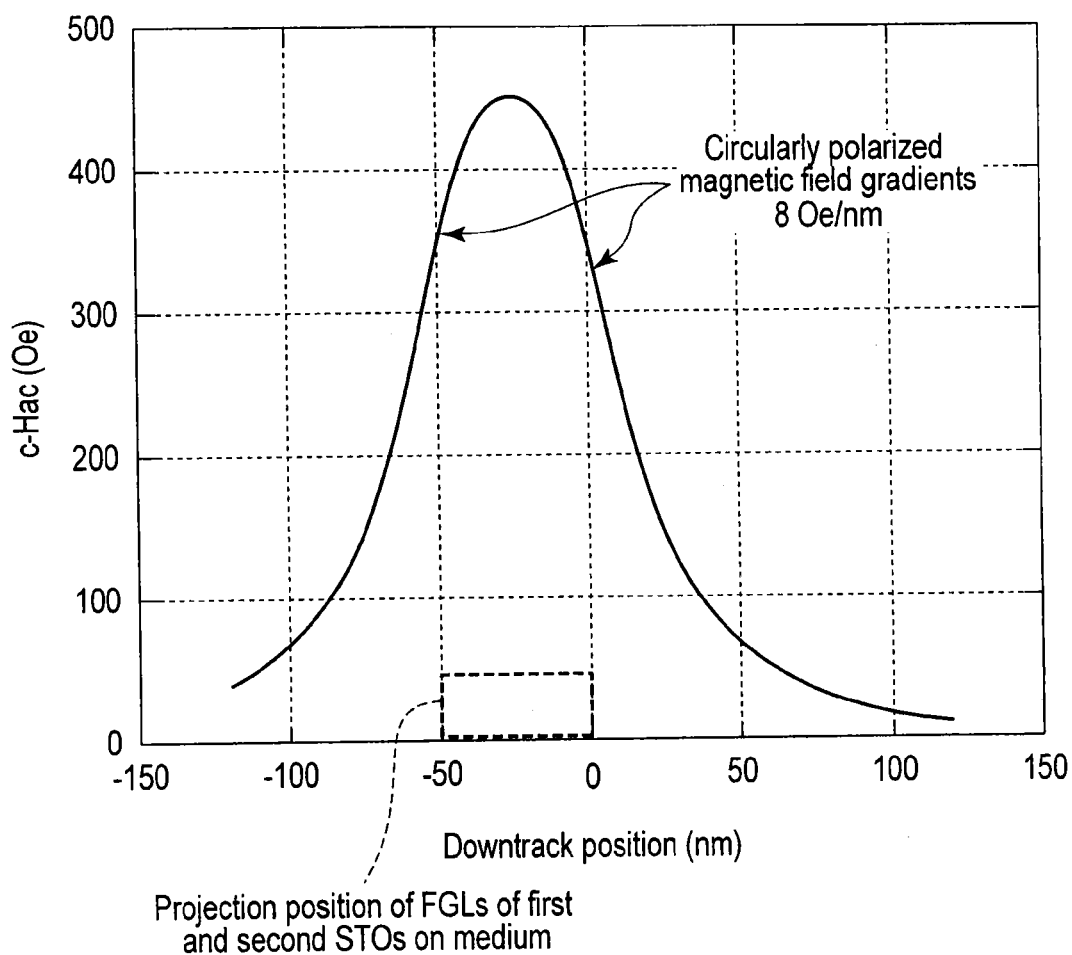
FIG. 8 is a graph illustrating the profile of the circularly polarized magnetic field in a down-track direction D.

FIG. 7 shows the profile of the circularly polarized magnetic field in the cross-track direction C, and FIG. 8 shows the profile of the circularly polarized magnetic field in the cross-track direction D. In the cross-track direction C, the intensity of the circularly polarized magnetic field greatly varies at end portions of the first and second STOs, whereby the circularly polarized magnetic field has gradients of as high as 20 (Oe/nm) at 350 (Oe). Thus, the recording density in the cross-track direction C is increased to increase the surface recording density. Note that the gradient of the circularly polarized magnetic field is equal in both cross-track directions, and therefore that the track forwarding direction during imbricate writing may be either of the cross-track directions. Accordingly, an optimal track forwarding direction can be set for each track position of the magnetic recording/reproducing apparatus. This can provide a magnetic recording/reproducing apparatus of a high recording density.

In the HDD constructed as the above, the head actuator 14 is angularly moved when the VCM 16 is driven, thereby positioning the magnetic head 33 on a desired track of the magnetic disk 12. Further, the magnetic head 33 is floated on the air flow C caused between the disk surface and the ABS 43 when the magnetic disk 12 rotates. When the HDD operates, the ABS 43 of the slider 42 opposes the disk surface with a clearance therebetween. As shown in FIG. 2, the magnetic head 33 floats above the surface of the magnetic disk 12, inclined such that the recording head 58 of the head portion 44 is positioned closest to the disk surface. In this state, recoded information is read from the magnetic disk 12, using the reproducing head 54, and information is written to the magnetic disk 12, using the recording head 58.

In writing information, as shown in FIG. 3, a DC current is supplied from the first and second STO drive current circuit 94 to the first and second STOs 80 and 82 to cause the first and second STOs 80 and 82 to generate high-frequency magnetic fields and to apply the high-frequency magnetic fields to the magnetic recording layer 103 of the magnetic disk 12. Further, an AC current is supplied from the recording current circuit 97 to the first and second coils 70 and 72, thereby exciting the main pole 60 by the first and second coils to apply a vertical recording magnetic field to the recording layer 103 of the magnetic disk 12 just below the main pole. As a result, information is recorded on the magnetic recording layer 103 with a desired track width. By superposing a high-frequency magnetic field on the recording magnetic field, magnetic recording of high holding power and high magnetic anisotropic energy can be realized.

In the above-described first embodiment, since the magnetic recording head incorporates a high-frequency oscillator provided between the main pole and each side shield, the gradient of a high-frequency magnetic field in a cross-track direction can be increased. By virtue of this structure, the cross-track directional recording density can be increased, and hence a magnetic recording head with an increased surface recording density and a magnetic recording/reproducing apparatus with this magnetic recording head can be provided.

Descriptions will now be given of magnetic recording heads incorporated in HDDs according to other embodiments. In the other embodiments, like reference numerals denote like elements, and no detailed descriptions will be given of the like elements. Detailed descriptions will be given mainly of the elements different from those of the first embodiment.

Second Embodiment

Figure 9:
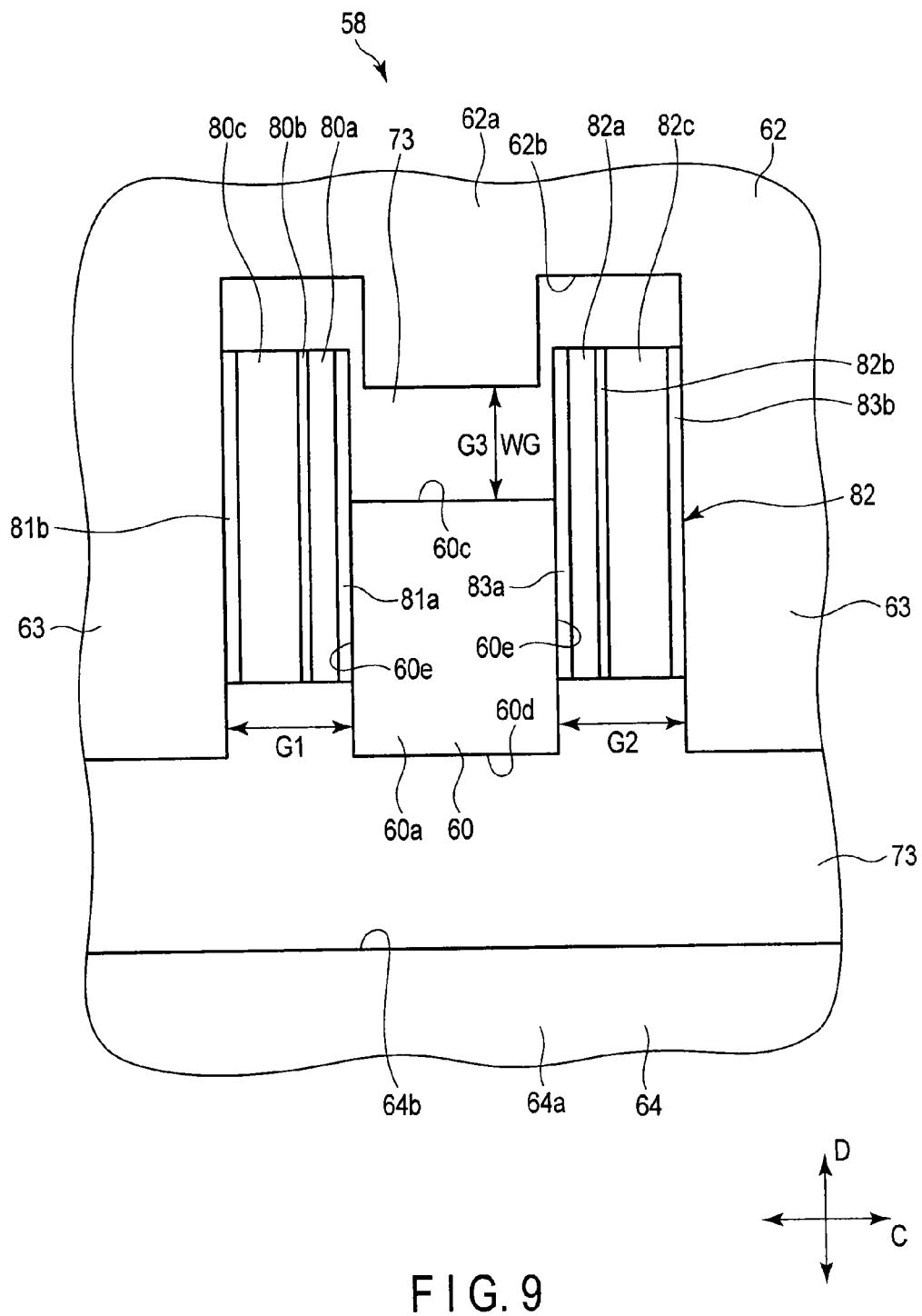
FIG. 9 is an exemplary plan view, viewed from the ABS side, showing the distal end of a magnetic recording head incorporated in an HDD according to a second embodiment.

FIG. 9 is a plan view, viewed from the ABS side, showing the distal end of the magnetic recording head of an HDD according to a second embodiment.

As shown in FIG. 9, a pair of side shields 63 are formed integral with the trailing shield 62 as one body, and extend from the leading side end surface 62b of the trailing shield 62 toward the leading shield 64. The pair of side shields 63 face each other, with respective side gaps G1 and G2 defined on the opposite cross-track directional sides of the main pole 60.

First and second STOs are provided in the gaps G1 and G2 between the main pole 60 and the side shields 63. Further, a protective insulating film 73 as an insulator is provided between the leading side end surface 60d of the main pole 60, the side shields 63, and the leading shield 64.

The main pole 60, the first STO 80, one of the side shields 63 and the trailing shield 62 constitute a power distribution circuit for distributing power to the first STO 80. Similarly, the main pole 60, the second STO 82, the other side shield 63 and the trailing shield 62 constitute a power distribution circuit for distributing power to the second STO 82. The first and second STO drive current circuit 94 is connected to the main pole 60 and the trailing shield 62.

In the second embodiment, the other elements of the magnetic recording head and the HDD have the same structures as the corresponding elements of the first embodiment.

In the second embodiment constructed as the above, since the magnetic recording head is constructed such that high-frequency oscillators are provided between the main pole and the respective side shields, the gradient of the cross-track directional high-frequency magnetic field is increased, whereby a magnetic recording head of a high surface recording density, and a magnetic recording/reproducing apparatus with this magnetic recording head, can be provided.

Third Embodiment

FIG. 10 is a plan view, viewed from the ABS side, showing the distal end of a magnetic recording head incorporated in an HDD according to a third embodiment.

As shown in FIG. 10, in the third embodiment, the layers forming the first and second STOs 80 and 82, which are provided in the side gaps G1 and G2 between the main pole 60 and the respective side shields 63, are stacked in the down-track direction D.

Namely, the first STO 80 comprises a spin-injection layer (SIL) 80a, an intermediate layer 80b and an oscillation layer (FGL) 80c stacked in this order in the down-track direction D from the main pole 60 toward the trailing shield 62. A non-magnetic metal layer 75 serving as an electrode layer is provided between the leading side end surface 60d of the main pole 60, the leading shield 64 and the side shields 63. The spin-injection layer 80a is stacked on the non-magnetic metal layer 75. Further, a second electrode layer 81b is provided between the oscillation layer 80c of the first STO 80 and the trailing shield 62 so that power can be distributed to the main pole 60, the first STO 80 and the trailing shield 62 in this order. The main pole 60, the non-magnetic metal layer 75, the first STO 80 and the trailing shield 62 constitute a power distribution circuit for distributing power to the first STO 80. Also, a protective insulating film 73 as an insulator is provided between the first STO 80 and the main pole 60 and between the first STO 80 and the side shields 63.

The second STO 82 comprises a spin-injection layer (SIL) 82a, an intermediate layer 82b and an oscillation layer (FGL) 82c stacked in this order in the down-track direction D from the main pole 60 toward the trailing shield 62. The spin-injection layer 82a is stacked on the non-magnetic metal layer 75. A second electrode layer 83b is provided between the main pole 60, the oscillation layer 82c of the second STO 82 and the trailing shield 62 so that power is distributed to the main pole 60, the second STO 82 and the trailing shield 62. The main pole 60, the second STO 82, the other side shield 63 and the leading shield 64 provide a power distribution circuit for distributing power to the second STO 82. Further, a protective insulating film 73 as an insulator is provided between the second STO 82 and the main pole 60 and between the second STO 82 and the side shields 63. The first and second STO drive current circuit 94 is connected to the main pole 60 and the trailing shield 62.

In the third embodiment, the other elements of the magnetic recording head and the HDD are similar to the corresponding elements of the first embodiment.

In the magnetic head of the third embodiment constructed as the above, since high-frequency oscillators are provided between the main pole and the respective side shields, the gradient of the cross-track directional high-frequency magnetic field is increased, whereby a magnetic recording head of a high surface recording density, and a magnetic recording/reproducing apparatus with this magnetic recording head, can be provided.

Fourth Embodiment

FIG. 11 is a schematic perspective view of a magnetic head incorporated in an HDD according to a fourth embodiment, partly in section taken along the track center of the magnetic head. FIG. 12 is a plan view, viewed from the ABS side, showing the distal end of the magnetic recording head of the HDD according to the fourth embodiment.

As shown in FIGS. 11 and 12, the recording head 58 of the HDD according to the fourth embodiment further comprises a third spin-torque oscillator (STO) 84 provided as a high-frequency oscillator in the write gap WG. The third STO comprises a spin-injection layer (SIL) 84a, an intermediate layer 84b and an oscillation layer (FGL) 84c stacked in this order in the down-track direction D from the main pole 60 toward the trailing shield 62.

A first electrode layer 85a is provided between the spin-injection layer 84a of the third STO 84 and the trailing side end surface 60c of the main pole 60, and a second electrode layer 85b is provided between the oscillation layer 84c of the third STO 84 and the trailing shield 62, so that power can be distributed to the main pole 60, the third STO 84 and the trailing shield 62 in this order. The main pole 60, the first electrode layer 85a, the third STO 84, the second electrode layer 85b and the trailing shield 62 provide a power distribution circuit for distributing power to the third STO 84.

As shown in FIG. 11, the first and second STO drive current circuit 94 for supplying drive currents to the first and second STOs 82 and 83 is connected to the main pole 60 and the leading shield 64 via terminals (electrode leads) 90 and 91. A third STO drive circuit 98 for supplying a drive current to the third STO 84 is connected to the main pole 60 and the trailing shield 62 via terminals (electrode leads) 90 and 92.

In the fourth embodiment, the other elements of the magnetic recording head and the HDD have the same structures as the corresponding elements of the first embodiment.

As shown in FIG. 12, in the fourth embodiment, the first, second and third spin-torque oscillators 80, 82 and 84 are formed equal to each other in size, film thickness and material. For instance, the film thickness of the oscillation layer (FGL) is set to 15 nm, Bs is set to 2.0 T, the film thickness of the spin-injection layer (SIL) is set to 6 nm, the vertical magnetic anisotropy Hk=13 kOe, and vertical coercive force Hc=4 kOe. As a result, the first, second and third STOs 80, 82 and 84 have substantially the same oscillation frequency.

The width (i.e., the size in the cross-track direction C) of the oscillator layer 84c is set to 50 nm, and its vertical size from the ABS 43 is set to 17 nm. The distance between the oscillation layers (FGL) 80c, 82c and 84c and the main pole 60 is set to 10 nm. The oscillation layers 80c, 82c and 84c are formed of, for example, an FeCo alloy, and the spin-injection layers 80a, 82a and 84a are formed of, for example, a Co/Pt artificial lattice. The intermediate layers 80b, 82b and 84b are formed of, for example, Cu. Alternatively, the oscillation layers and the spin-injection layers may be formed of an alloy containing at least Fe, Co and/or Ni, a Co/Ni artificial lattice, an Fe/Co artificial lattice, a Co/Pd artificial lattice, an FeCo/Ni artificial lattice, a Whistler alloy such as CoFeMnGe or CoFeMnSi, or a laminated structure of some of the above-mentioned materials.

The distance (G3) between the main pole 60 and the trailing shield 62 is substantially equal to the distance (G1, G2) between the main pole 60 and each side shield 63. The write gap magnetic field between the main pole 60 and the trailing shield 62 is substantially equal to that between the main pole 60 and each side shield 63, and is, for example, 8 kOe. As a result, the first, second and third STOs 80, 82 and 84 operate or oscillate under substantially the same condition, thereby enabling efficiently superposed high-frequency magnetic fields to be applied to the magnetic disk 12. This leads to increases in high-frequency field intensity and in surface recording density.

Further, the write gap magnetic field and side gap magnetic field are sufficiently greater than the magnetic field Hc (=4 kOe) of the oscillation layers 80c, 82c and 84c. Accordingly, when the recording polarity has changed, the direction of magnetization of the oscillation layers 80c, 82c and 84c is inverted to the direction of magnetization of the write gap magnetic field and side gap magnetic field.

Although in the fourth embodiment, the spin-injection layers 80a, 82a and 84a of the first, second and third STOs are provided closer to the main pole 60 than the oscillation layers 80c, 82c and 84c, respectively, they may be provided remoter from the main pole 60 than the respective oscillation layers. Through thus improving the magnetic characteristic and spin-torque characteristic of the spin-injection layers and oscillation layers, the high-frequency magnetic field intensities of the first, second and third STOs can be increased to thereby enhance the surface recording density.

The stacking order of the layers may differ among the first, second and third STOs 80, 82 and 84. Also in this case, through the improvement of the magnetic characteristic and spin-torque characteristic of the spin-injection layer and oscillation layer of each STO, the high-frequency field intensity of each STO can be increased to thereby enhance the surface recording density.

Although in the fourth embodiment, the first, second and third STOs 80, 82 and 84 are made substantially equal in film thickness and material, the invention is not limited to this. In order to improve the oscillation characteristic of each STO, the STOs may have different sizes or film thicknesses, or be formed of different materials. This enables the high-frequency magnetic field intensities of the first, second and third STOs 80, 82 and 84 to be increased to thereby enhance the surface recording density.

When drive currents are supplied from the first and second STO drive current circuit 94 and the third STO drive current circuit 98 to the first, second and third STOs 80, 82 and 84, and a recording current is supplied from the recording current circuit 97 to the first and second coils 70 and 72, the first, second and third STOs 80, 82 and 84 oscillate. Since the write gap magnetic field and side gap magnetic field are sufficiently greater than the magnetic fields Hc (=4 kOe) of the spin-injection layers 80a, 82a and 84a of the first, second and third STOs 80, 82 and 84, the direction of magnetization of the spin-injection layers is inverted to the direction of magnetization of the write gap magnetic field and side gap magnetic field when the recording polarity has changed. Thus, regardless of whether the recording polarity is positive or negative, a high-frequency magnetic field of a constant oscillation frequency can be generated by supplying direct currents as the first and second STO drive currents.

Figure 13:
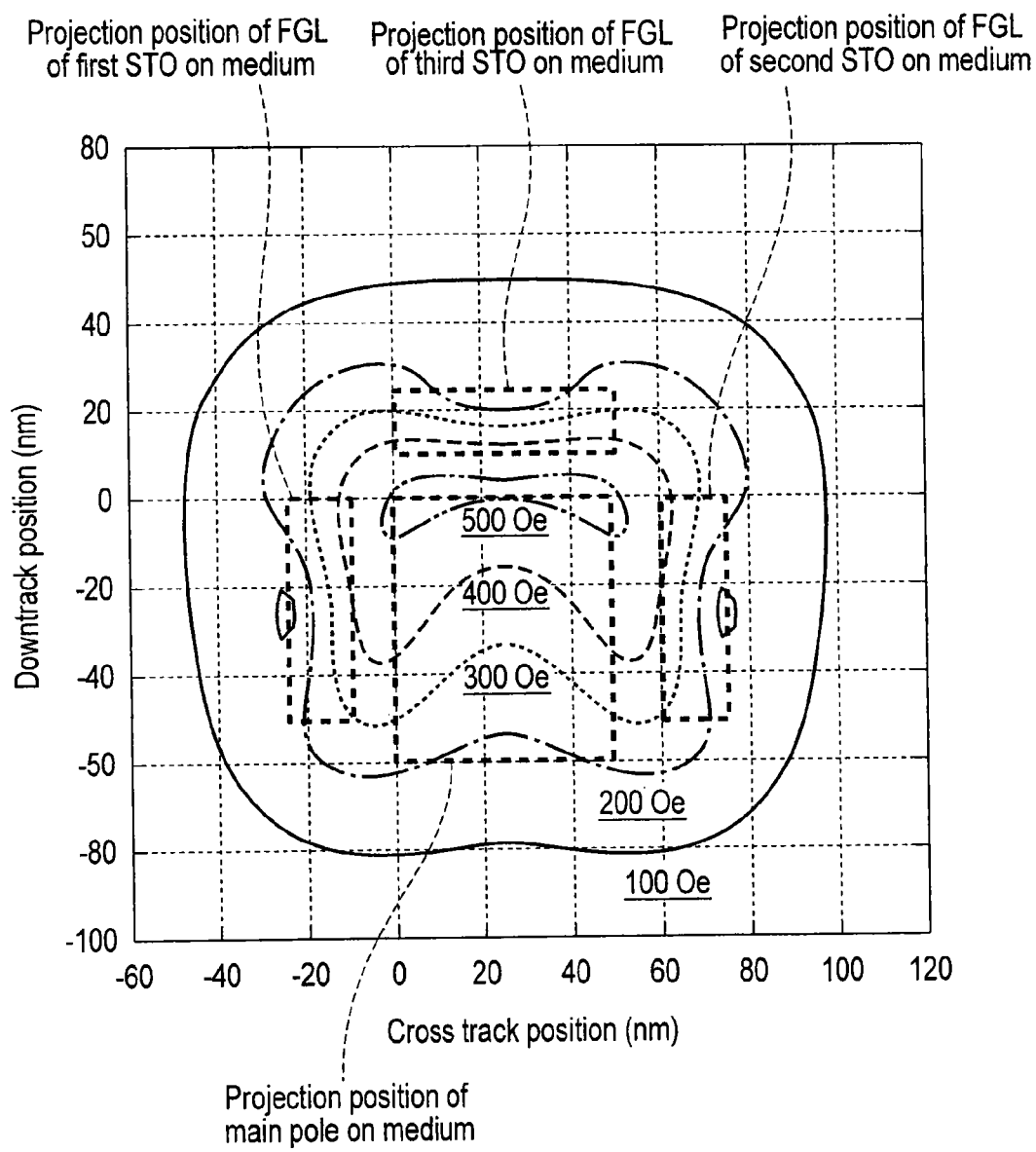
FIG. 13 is a graph, illustrating the distribution of the intensities of a high-frequency circularly polarized magnetic field generated on a magnetic disk (recording medium) by first, second and third STOs in the fourth embodiment.

FIG. 13 shows the distribution of the intensities of a high-frequency circularly polarized magnetic field generated on a magnetic disk (recording medium) by first, second and third STOs. This circularly polarized magnetic field is a circularly polarized component that is parallel to the surface of the medium and is in a direction in which it assists magnetization inversion of the medium. The distance between the ABS 43 and the center of the magnetic disk is 20 nm.

The magnetization of the oscillation layers 80c, 82c and 84c oscillates about the magnetic flux generated by the main pole 60. Accordingly, the first and second STOs 80 and 82 oscillate about an axis extending through the main pole 60 and the side shields 63, while the third STO 84 oscillates about an axis extending through the main pole 60 and the trailing shield 62. Further, the circularly polarized component for assisting magnetization inversion of the magnetic disk is unevenly distributed on the main pole 60 side of the oscillation layers 80c, 82c and 84c, and is greatly reduced on the opposite side of the main pole side. As a result, the circularly polarized magnetic fields generated by the first, second and third STOs 80, 82 and 84 mutually reinforce each other to thereby generate a circularly polarized magnetic field with a maximum intensity of 510 (Oe) at the track center. The distribution of the intensities of this magnetic field is symmetrical in the cross-track direction C.

Figure 14:
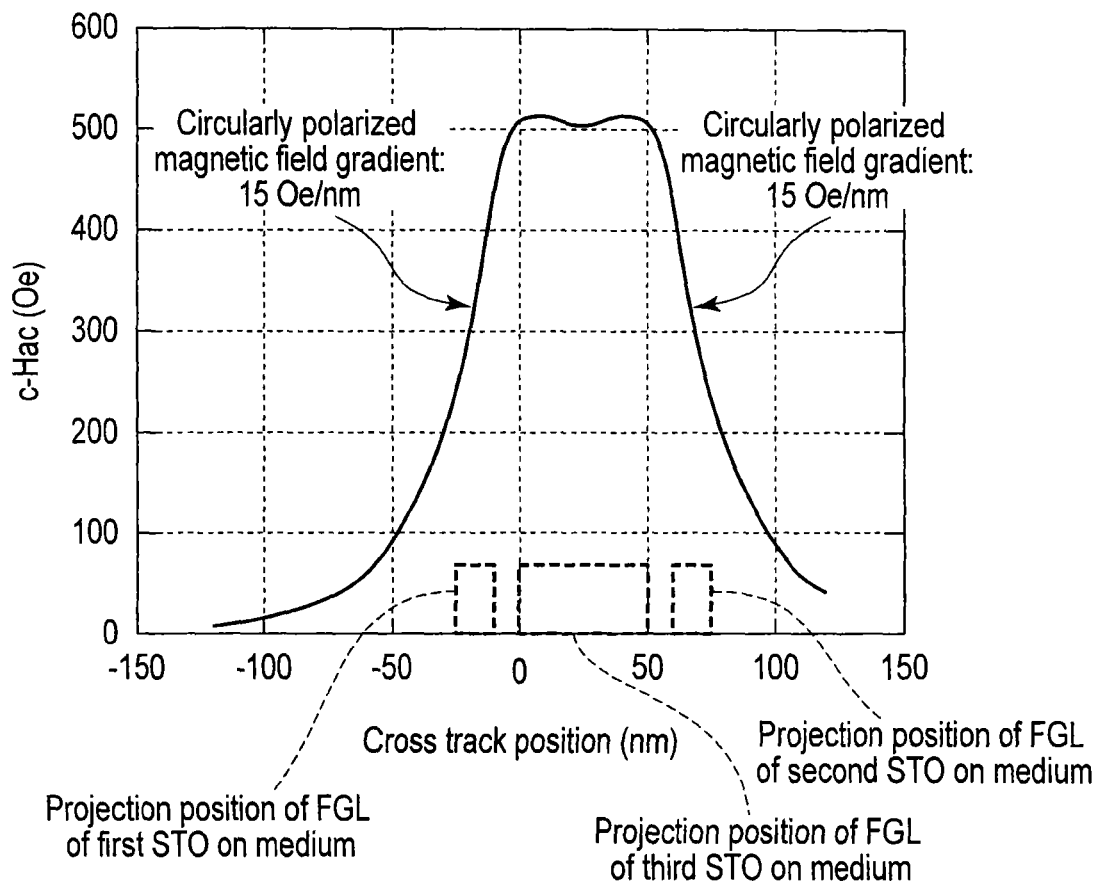
FIG. 14 is a graph illustrating the profile of a circularly polarized magnetic field in the cross-track direction C in the fourth embodiment.
Figure 15:
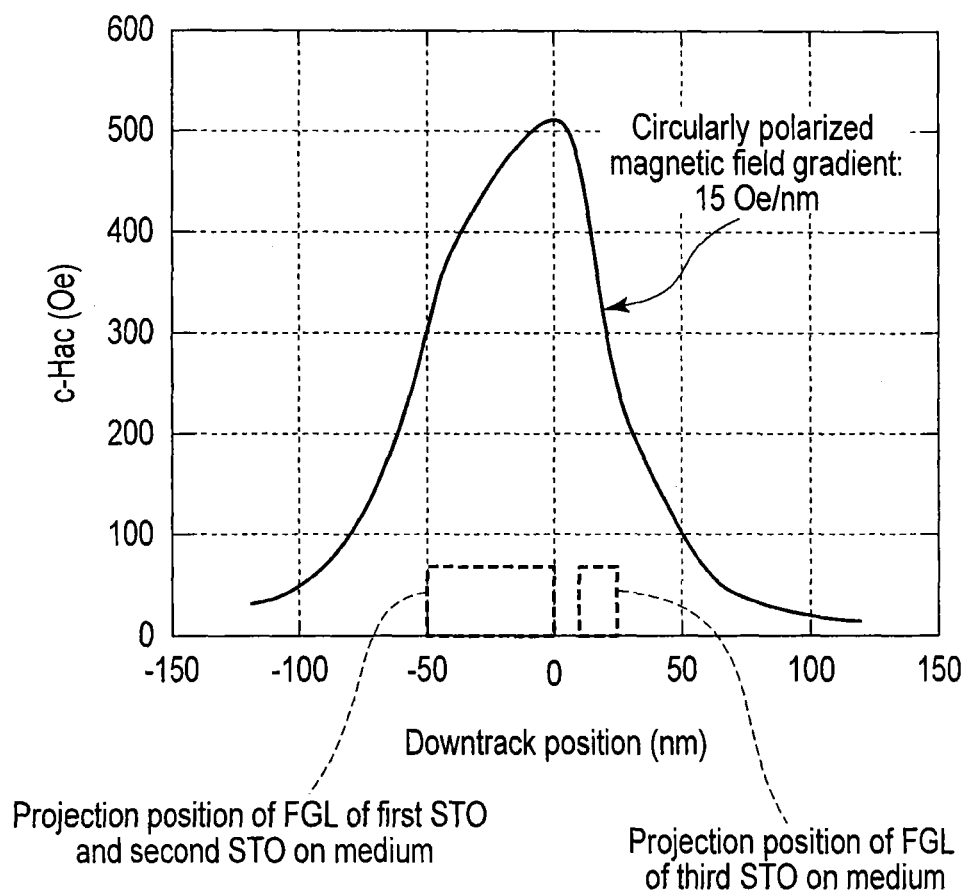
FIG. 15 is a graph illustrating the profile of a circularly polarized magnetic field in the down-track direction D in the fourth embodiment.

FIG. 14 is a graph illustrating the profile of a circularly polarized magnetic field in the cross-track direction C, and FIG. 15 is a graph illustrating the profile of a circularly polarized magnetic field in the down-track direction D. In the cross-track direction C, the circularly polarized magnetic field greatly varies at ends of the first and second STOs 80 and 82, and has gradients of as high as 15 (Oe/nm). This enables increases in high-frequency field intensity in the cross-track direction and in surface recording density. Note that the gradient of the circularly polarized magnetic field is equal in both cross-track directions, and therefore that the track forwarding direction during imbricate writing may be either of the cross-track directions. Accordingly, an optimal track forwarding direction can be set for each track position of the magnetic recording/reproducing apparatus. This can provide a magnetic recording/reproducing apparatus of a high recording density.

In the magnetic head of the fourth embodiment constructed as the above, since high-frequency oscillators are provided in the magnetic head between the main pole and the respective side shields, and the third high-frequency oscillator is provided in the write gap, the gradient of the cross-track directional high-frequency magnetic field is increased, whereby a magnetic recording head of a high surface recording density, and a magnetic recording/reproducing apparatus with this magnetic recording head, can be provided.

Fifth Embodiment

Figure 16:
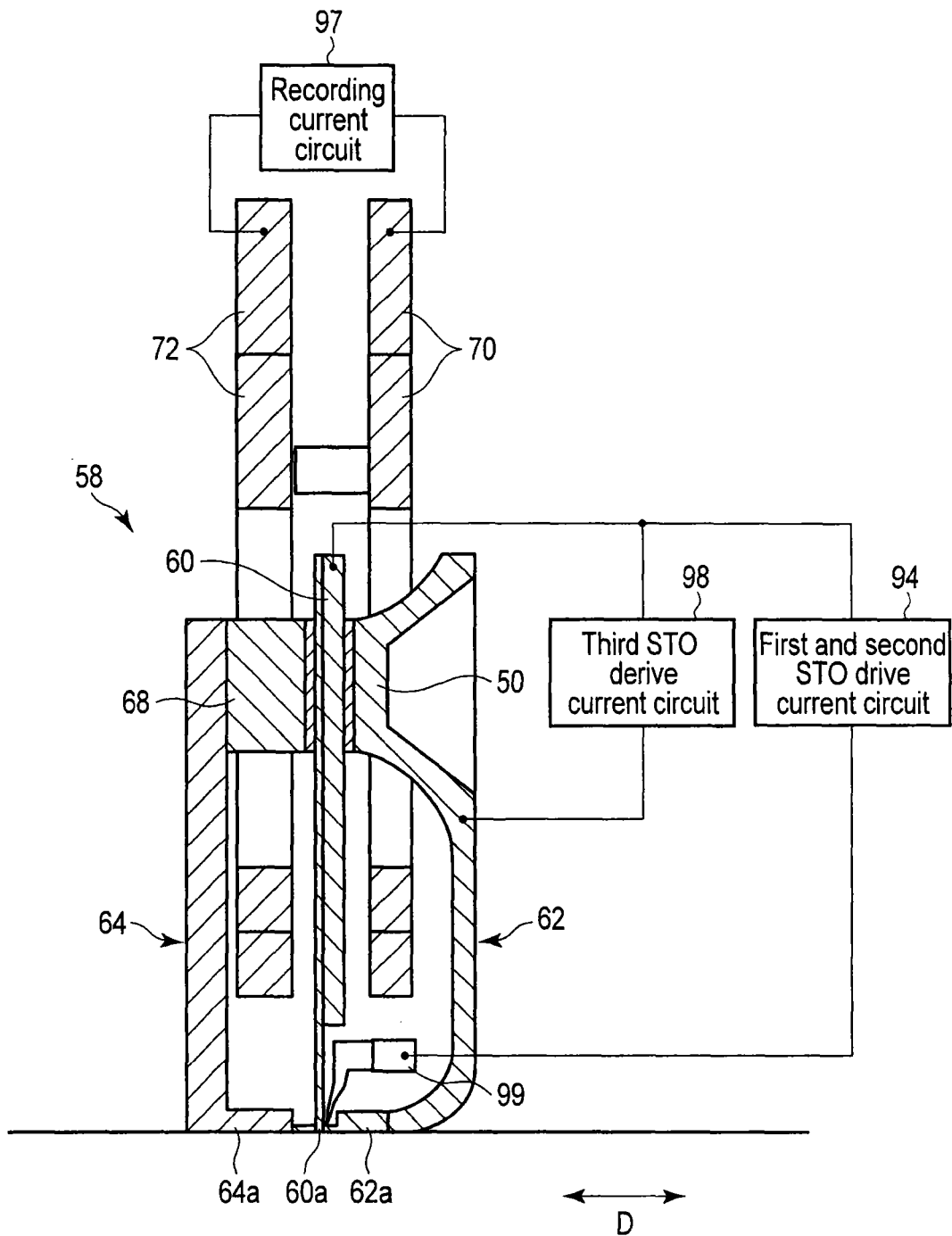
FIG. 16 is an exemplary schematic cross-sectional view of a magnetic head incorporated in an HDD according to a fifth embodiment, taken along the track center of the magnetic head.
Figure 17:
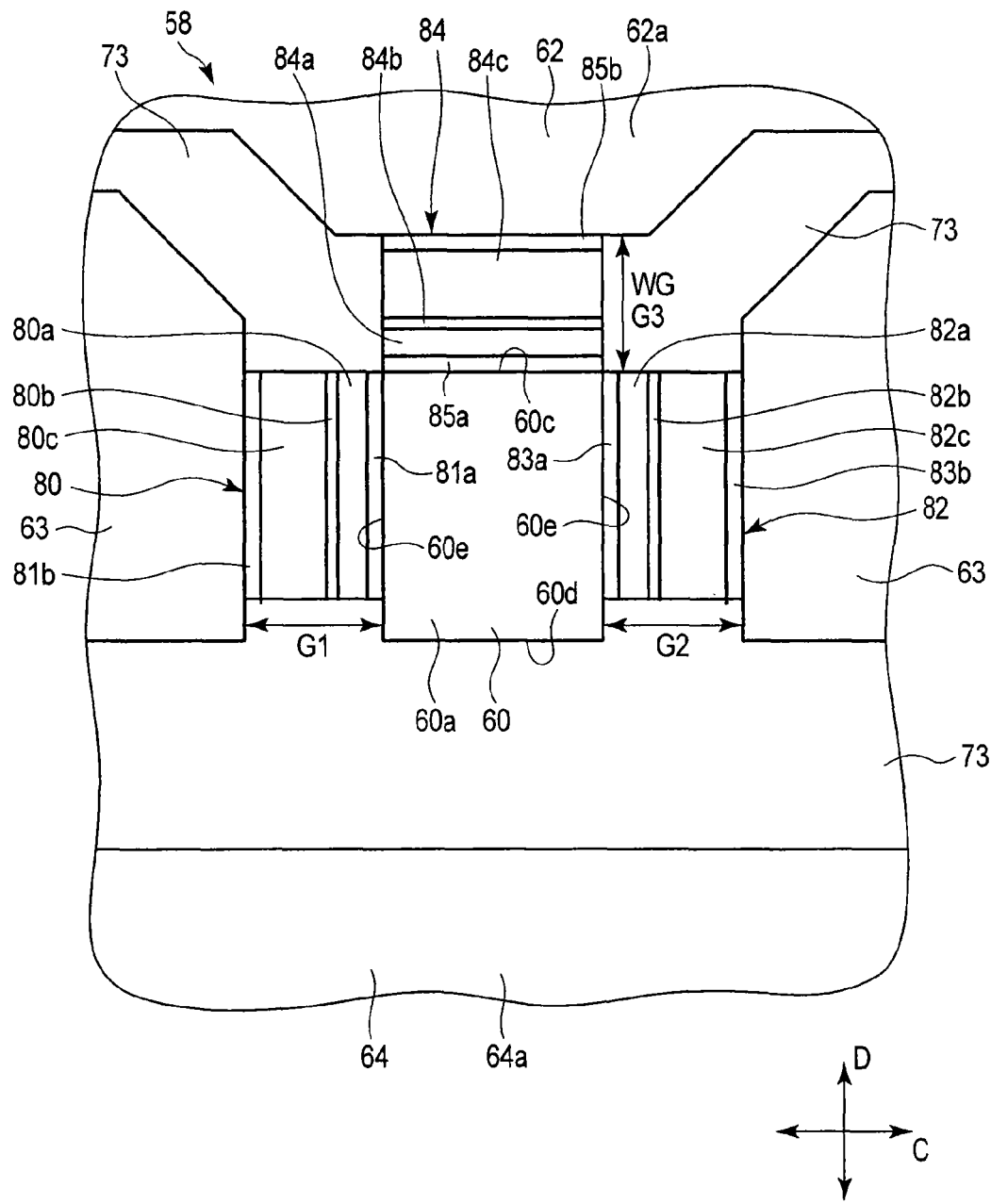
FIG. 17 is an exemplary plan view, viewed from the ABS side, showing the distal end of the magnetic recording head of the HDD according to the fifth embodiment.

FIG. 16 is an exemplary schematic cross-sectional view of a magnetic head incorporated in an HDD according to a fifth embodiment, taken along the track center of the magnetic head, and FIG. 17 is an exemplary plan view, viewed from an air bearing surface (ABS) side, showing the distal end of the magnetic recording head of the HDD according to the fifth embodiment.

As shown in FIG. 17, in the fifth embodiment, a protective insulation film 73 formed of a non-magnetic and serving as an insulator is provided between each side shield 63 and the trailing shield 62, thereby separating the side shields from the trailing shield. Further, the protective insulation film 73 is also provided between the leading side end surface 60d of the main pole 60, the side shields 63 and the leading shield 64 to thereby separate the leading shield from the side shields. The first and second STOs 80 and 82 are provided in gaps G1 and G2 defined between the main pole 60 and the respective side shields 63, respectively, and the third STO 84 is provided in a write gap WG between the main pole 60 and the trailing shield 62.

By thus isolating the side shields 63, the trailing shield 62 and the leading shield 64 by the non-magnetic material, the magnetic fields generated on a recording medium by the shields can be controlled individually. More specifically, the magnetic flux applied by the main pole 60 to the recording medium is returned mainly through the leading shield 64 to thereby reduce the magnetic field returned to the trailing shield 62 and the side shields 63. As a result, writing of data to adjacent tracks by the side shields 63, and overwriting of data on a recording signal by the trailing shield 62, can be reduced, whereby data can be efficiently recorded only on the area in the vicinity of the main pole 60.

Further, by isolating the first, second and third STOs 80, 82 and 84 using the insulator, drive currents supplied to the STOs can be controlled individually. This stabilizes the STOs and enables them to oscillate with appropriate frequencies. Consequently, the recording magnetic field and the circularly polarized magnetic field can be concentrated on the area in the vicinity of the main pole 60, thereby increasing the gradients of the recording magnetic field and the circularly polarized magnetic field. In addition, the recording densities in the down-track direction D and the cross-track direction C can be increased to thereby increase the surface recording density.

As shown in FIG. 16, the third STO drive current circuit 98 is connected to electrode leads extended from the main pole 60 and the trailing shield 62. The third STO drive current circuit 98 supplies a drive current to the third STO via the main pole 60 and the trailing shield 62. The third STO drive current circuit 94 is connected to the main pole 60 and an electrode lead 99 extended from the side shields 63. The third STO drive current circuit 94 supplies drive currents to the first and second STOs 80 and 82 via the main pole 60 and the side shields 63.

By independently controlling the first and second STO drive current circuit 94 and the third STO drive current circuit 98, the drive currents can be controlled so that the STOs oscillate optimally. This stabilizes the oscillation states of the STOs to enable the STOs to oscillate with optimal frequencies. As a result, the high-frequency magnetic intensity is increased to thereby increase the recording density in the cross-track direction and increase the surface recording density.

In the fifth embodiment, the other elements of the magnetic recording head and the HDD have the same structures as the corresponding elements of the above-described first or fourth embodiment.

In the magnetic recording head of the fifth embodiment constructed as the above, since high-frequency oscillators are provided between the main pole and the side shields, and a third high-frequency oscillator is provided in a write gap, the gradients of the high-frequency magnetic field in the cross-track direction are increased, with the result that the recording density in the cross-track direction is increased. Thus, the fifth embodiment can provide a magnetic recording head of a high surface recording density, and a magnetic recording/reproducing apparatus with this magnetic recording head.

Sixth Embodiment

Figure 18:
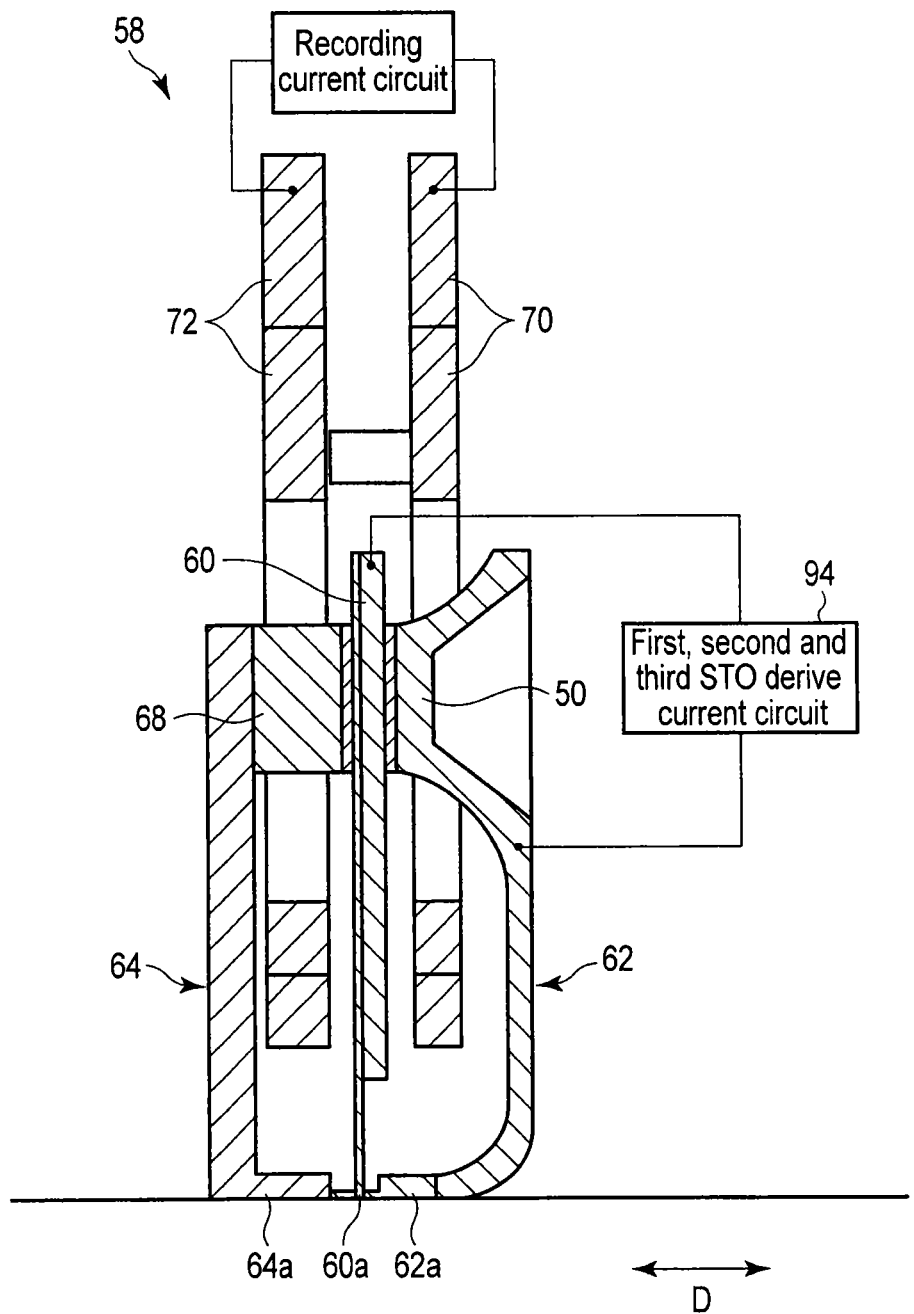
FIG. 18 is an exemplary schematic cross-sectional view of a magnetic head incorporated in an HDD according to a sixth embodiment, taken along the track center of the magnetic head.

FIG. 18 is an exemplary schematic cross-sectional view of a magnetic head incorporated in an HDD according to a sixth embodiment, taken along the track center of the magnetic head, and FIG. 19 is an exemplary plan view, viewed from the ABS side, showing the distal end of the magnetic recording head of the HDD according to the sixth embodiment.

As shown in FIG. 19, in the sixth embodiment, a trailing shield 62, a pair of side shields 63 and a leading shield 64 are formed integral as one body, and are electrically and magnetically connected to each other. The other elements of the magnetic recording head 58 have the same structures as the corresponding elements of the magnetic recording head of the fourth embodiment shown in FIG. 12.

As shown in FIG. 18, in the sixth embodiment, a first, second and third STO drive current circuit 94 is connected to electrode leads extended from the main pole 60 and the trailing shield 62. The first, second and third STO drive current circuit 94 supplies an STO drive current to the first, second and third STOs 80, 82 and 84 via the main pole 60, the trailing shield 62 and the side shields 63. Thus, by using a single common power distributing electrode for the first, second and third STOs 80, 82 and 84, the recording densities in the down-track direction D and the cross-track direction C can be increased with the terminal structure simplified, thereby increasing the surface recording density.

Also in the sixth embodiment, since high-frequency oscillators are provided between the main pole and the side shields, and a third high-frequency oscillator is provided in a write gap, the gradients of the high-frequency magnetic field in the cross-track direction are increased, with the result that the recording density in the cross-track direction is increased. Thus, the sixth embodiment can provide a magnetic recording head of a high surface recording density, and a magnetic recording/reproducing apparatus with this magnetic recording head.

The above-mentioned sixth embodiment can be modified as in the first modification shown in FIG. 20 such that a protective insulation film 73 as an insulator is provided between the leading shield 64 and the side shields 63 to electrically isolate them. Also in this case, by supplying currents to the first, second and third STOs 80, 82 and 84 via the main pole 60, the trailing shield 62 and the side shields 63, the recording densities can be increased in the down-track direction D and the cross-track direction C, thereby increasing the surface recording density.

Seventh Embodiment

Figure 21:
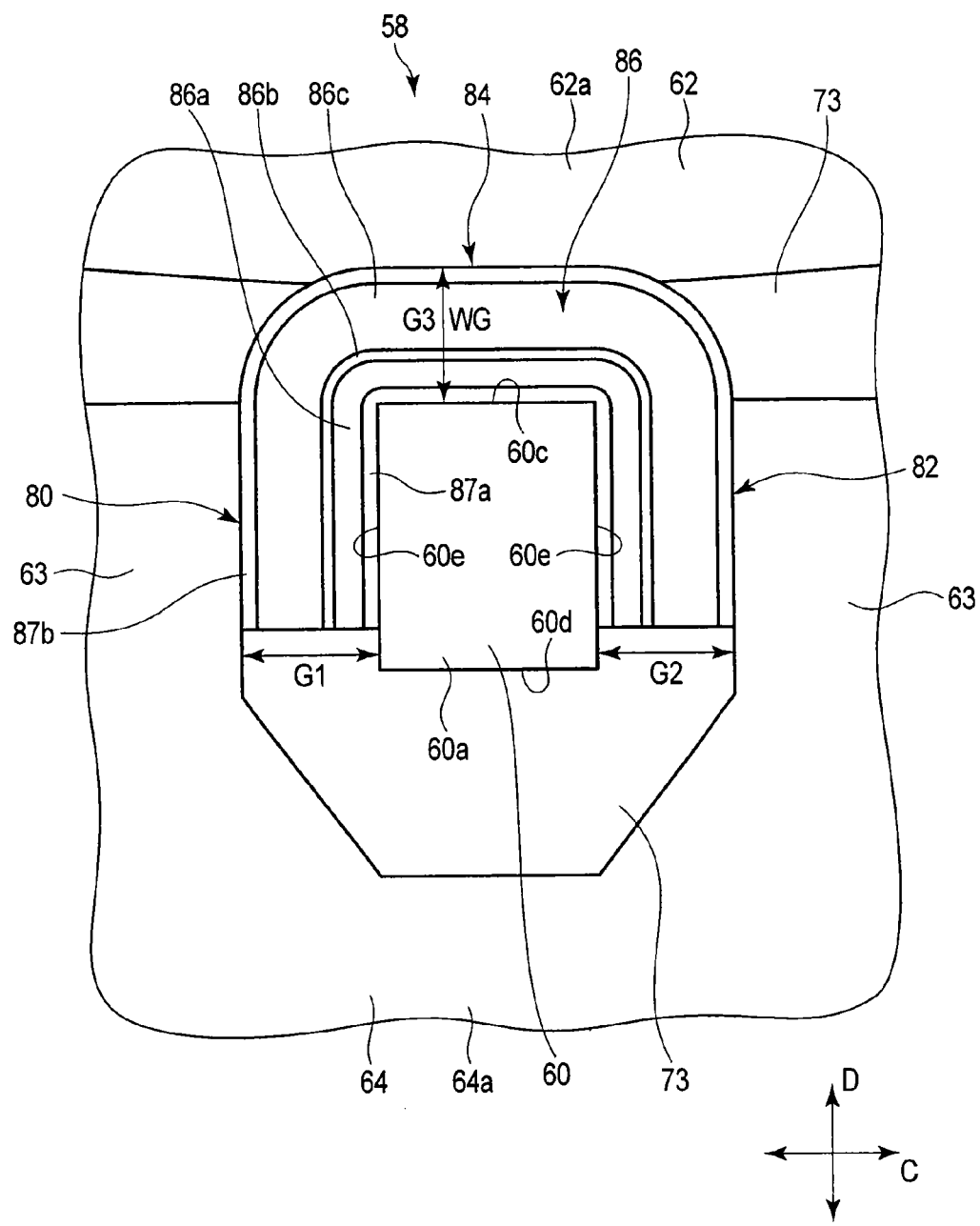
FIG. 21 is an exemplary plan view, viewed from the ABS side, showing the distal end of a magnetic recording head incorporated in an HDD according to a seventh embodiment.

FIG. 21 is a view, viewed from the ABS side, showing the distal end of a magnetic recording head incorporated in an HDD according to a seventh embodiment.

In the seventh embodiment, the first, second and third STOs 80, 82 and 84 constitute a common STO 86 formed of continuous layers as one body. The STO 86 is substantially U-shaped to surround the trailing side end surface 60c and the opposite surfaces 60e of the main pole 60. More specifically, the STO 86 comprises a continuous spin-injection layer 86a of a constant thickness, a continuous intermediate layer 86b of a constant thickness, and a continuous oscillation layer 86c of a constant thickness. These layers are stacked in this order from the main pole 60 toward the trailing shield 62 and the side shields 63. Further, a first electrode layer 87a is formed between each of the trailing side end surface 60c and opposite side surfaces 60e of the main pole 60, and the spin-injection layer 86a. Similarly, a continuous second electrode layer 87b is formed between the oscillation layer 86c and a pair of side shields 63.

In the seventh embodiment, a protective insulation layer 73 as an insulator is formed between the trailing shield 62 and the side shields 63 to electrically isolate the trailing shield 62 from the side shields 63. The STO 86 is electrically connected to the main pole 60 via the side shields 63 in the cross-track direction C, and electrically connected to the main pole 60 via the trailing shield 62 in the down-track direction D.

As in the fourth embodiment shown in FIG. 11, the first and second STO drive current circuit 94 is connected to the main pole 60 and the leading shield 64, while the third STO drive current circuit 98 is connected to the main pole 60 and the trailing shield 62. When the drive current circuits 94 and 98 supply drive currents to the STO 86, only the STO 86 oscillates, whereby the recording density in the cross-track direction C is increased to increase the surface recording density.

Figure 22:
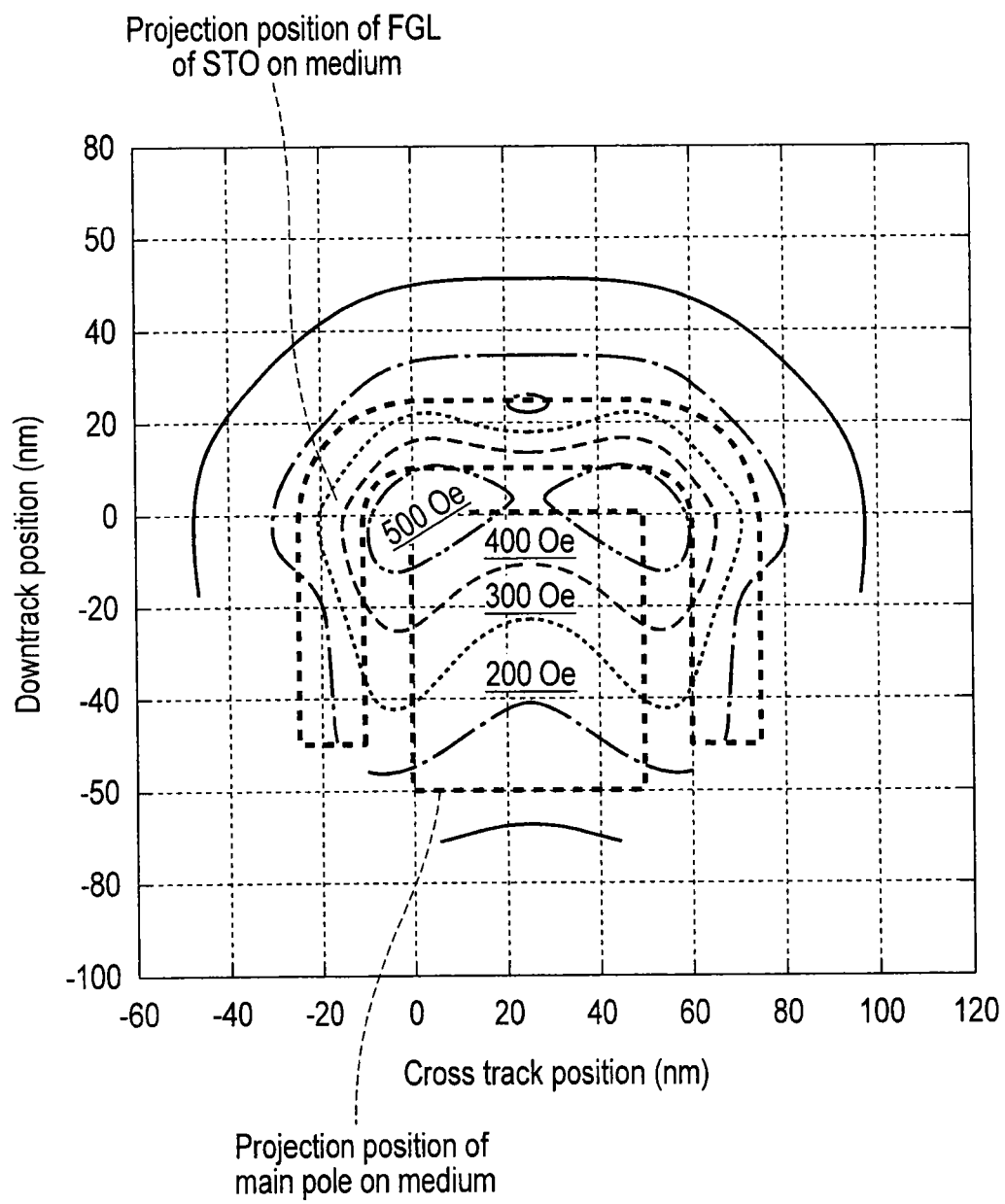
FIG. 22 is a graph, illustrating the distribution of the intensities of a high-frequency circularly polarized magnetic field generated on a magnetic disk (recording medium) by first, second and third STOs in the seventh embodiment.

FIG. 22 is a graph, illustrating the distribution of the intensities of a high-frequency circularly polarized magnetic field generated on a magnetic disk (recording medium) by the STO 86 (first, second and third STOs 80, 82 and 84). This circularly polarized magnetic field is a circularly polarized component that is parallel to the surface of the medium and is in a direction in which it assists magnetization inversion of the medium. The distance between the ABS 43 and the center of the magnetic disk is 20 nm.

The magnetization of the oscillation layer 86c oscillates about the magnetic flux generated by the main pole 60. Accordingly, the first and second STOs 80 and 82 oscillate about an axis extending through the main pole 60 and the side shields 63, while the third STO 84 oscillates about an axis extending through the main pole 60 and the trailing shield 62. As a result, the circularly polarized magnetic fields generated by the first, second and third STOs 80, 82 and 84 mutually reinforce each other to thereby generate a circularly polarized magnetic field with a maximum intensity of 510 (Oe) at the track center. The distribution of the intensities of this magnetic field is symmetrical in the cross-track direction C.

Figure 23:
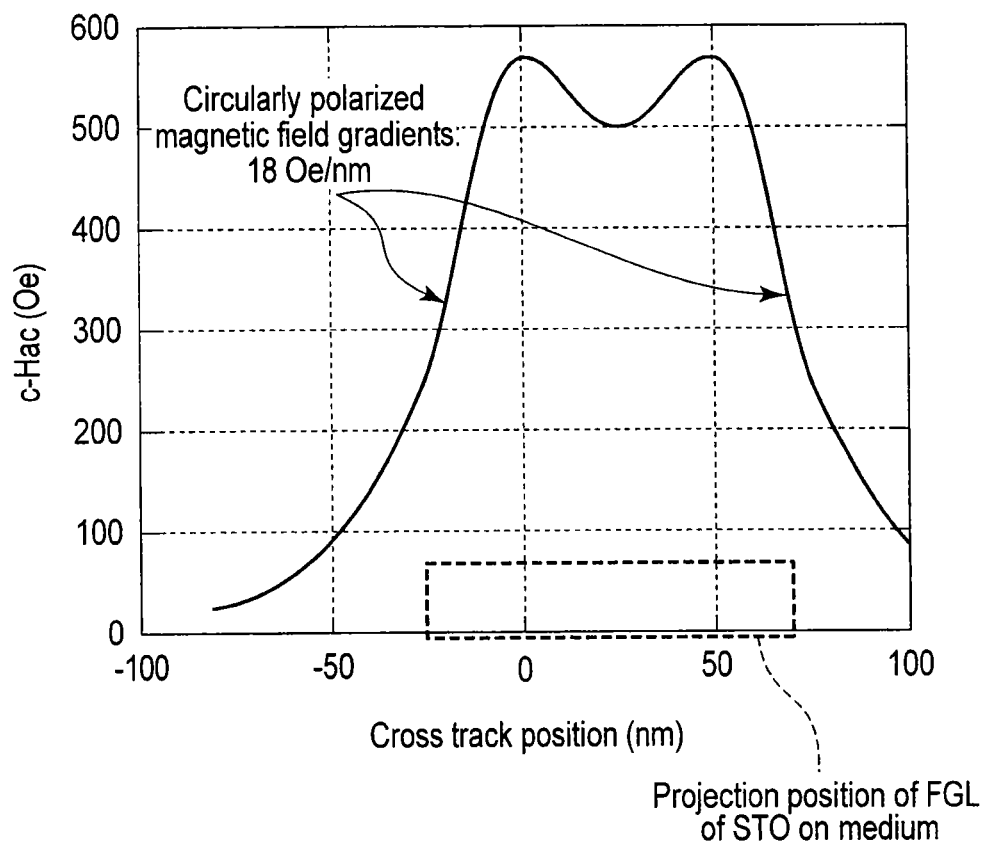
FIG. 23 is a graph illustrating the profile of a circularly polarized magnetic field in the cross-track direction C in the seventh embodiment.
Figure 24:
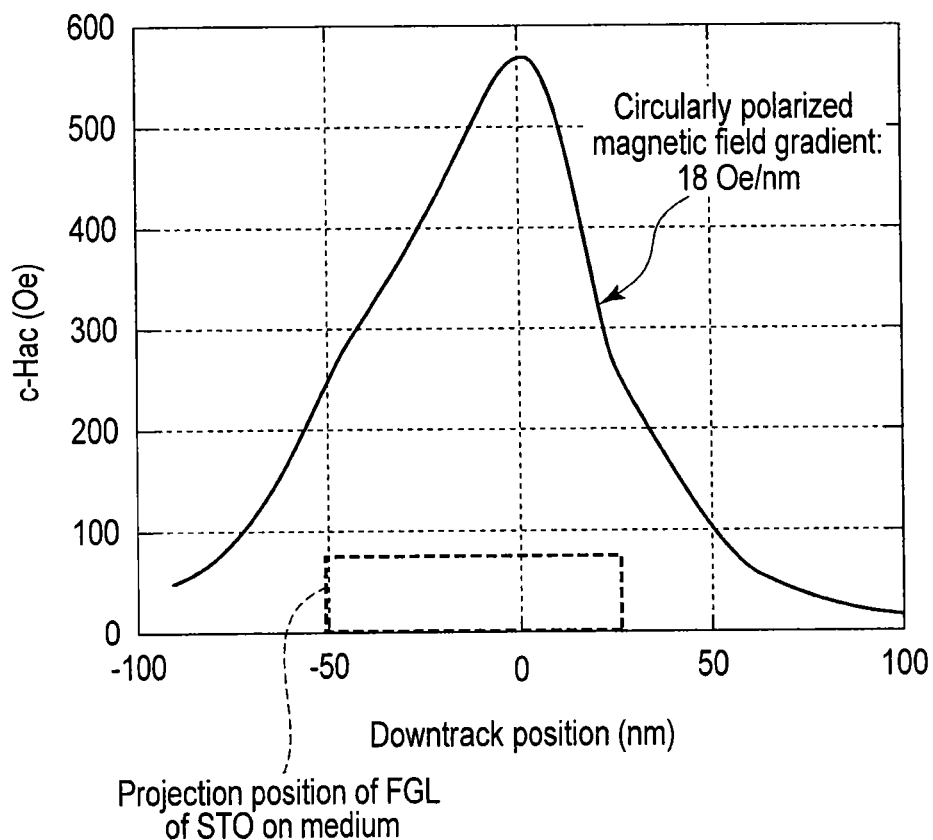
FIG. 24 is a graph illustrating the profile of a circularly polarized magnetic field in the down-track direction D in the seventh embodiment.

FIG. 23 is a graph illustrating the profile of a circularly polarized magnetic field in the cross-track direction C, and FIG. 24 is a graph illustrating the profile of a circularly polarized magnetic field in the down-track direction D. In the cross-track direction C, the circularly polarized magnetic field greatly varies at the opposite ends of the STO 86, and has gradients of as high as 18 (Oe/nm) at the opposite ends. Thus, the recording density in the cross-track direction C is increased to increase the surface recording density. Note that the gradient of the circularly polarized magnetic field is equal in both cross-track directions, and therefore that the track forwarding direction during imbricate writing may be either of the cross-track directions. Accordingly, an optimal track forwarding direction can be set for each track position of the magnetic recording/reproducing apparatus. This can provide a magnetic recording/reproducing apparatus of a high recording density.

The seventh embodiment can be modified as shown in the second modification of FIG. 25, such that the trailing shield 62 and the side shields 63 are formed integral as one body and are electrically and magnetically connected to each other. In this case, the STO 86 is electrically connected to the main pole 60 via the side shields 63 in the cross-track direction C, and is electrically connected to the main pole 60 via the trailing shield 62 in the cross-track direction D. Further, the first, second and third STO drive current circuit 94 is connected to electrode leads extended from the main pole 60 and the trailing shield 62, as in the sixth embodiment shown in FIG. 18. The first, second and third STO drive current circuit 94 supplies an STO drive current to the STO 86 via the main pole 60, the trailing shield 62 and the side shields 63.

When the drive current circuit 94 supplies a drive current, the current is guided to the trailing shield 62 and the side shields 63 via the main pole 60 and the STO 86 to oscillate the whole STO 86. As a result, the recording density is increased in the cross-track direction C to thereby increase the surface recording density.

Figure 26:
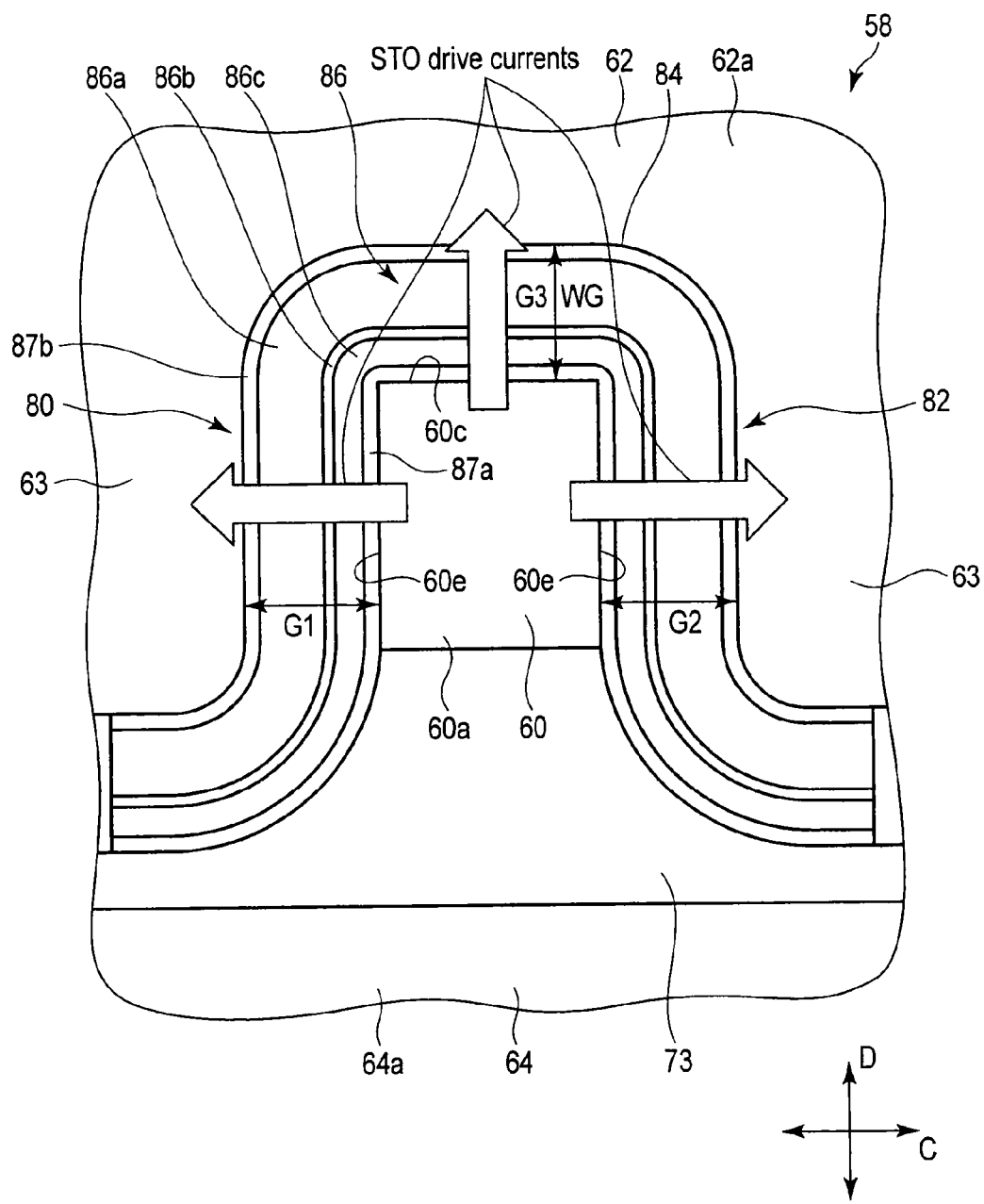
FIG. 26 is an exemplary plan view, viewed from the ABS side, showing the distal end of a magnetic recording head incorporated in an HDD according to a third modification.

FIG. 26 is an exemplary plan view, viewed from the ABS side, showing the distal end of a magnetic recording head according to a third modification. In the third modification, the STO 86 is formed to continuously surround the trailing side end surface 60c and opposite side surfaces 60e of the main pole 60. Further, the opposite ends of the STO 86 round the respective leading side portions of the side shields 63. The trailing shield 62 and the side shields 63 are formed integral as one body and are electrically and magnetically connected to each other. Further, a protective insulation film 73 as an insulator is provided between the side shields 63 and the leading shield 64 to electrically isolate them.

Consequently, the STO 86 is electrically connected to the main pole 60 via the side shields 63 in the cross-track direction C, and is electrically connected to the main pole 60 via the trailing shield 62 in the cross-track direction D. When a drive current is supplied, it is guided to the trailing shield 62 and the side shields 63 to oscillate the whole STO 86. As a result, the recording density is increased in the cross-track direction C to thereby increase the surface recording density.

In the second and third modifications, the other structure of the recording head 58 is similar to that of the above-described seventh embodiment or other embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, the materials, shapes, sizes, etc. of the elements incorporated in the head portion may be changed when necessary. Furthermore, in the magnetic disk device, the number of magnetic disks and the magnetic heads can be increased when necessary, and various sizes of magnetic heads can be used.

What is claimed is:

1. A magnetic head comprising:
   a main pole configured to apply a recording magnetic field to a recording layer included in a recording medium;
   a trailing shield opposing the main pole in a down-track direction, with a write gap interposed therebetween;
   a pair of side shields opposing the main pole on opposite sides of the main pole in a cross-track direction, with respective gaps interposed therebetween;
   a recording coil configured to cause the main pole to generate a magnetic field;
   a first high-frequency oscillator provided between the main pole and one of the side shields and electrically connected to the main pole and the one side shield, the main pole, the first high-frequency oscillator and the one side shield constituting a power distribution circuit configured to distribute power to the main pole, the first high-frequency oscillator and the one side shield in this order; and
   a second high-frequency oscillator provided between the main pole and the other side shield and electrically connected to the main pole and the other side shield, the main pole, the second high-frequency oscillator and the other side shield constituting a power distribution circuit configured to distribute power to the main pole, the second high-frequency oscillator and the other side shield in this order.

2. The magnetic recording head of claim 1, wherein each of the first and second high-frequency oscillators comprises a spin-injection layer, an intermediate layer, and an oscillation layer.

3. The magnetic recording head of claim 2, wherein the spin-injection layer, the intermediate layer and the oscillation layer of the first high-frequency oscillator are stacked along a line of arrangement of the main pole and the one side shield; and
   the spin-injection layer, the intermediate layer and the oscillation layer of the second high-frequency oscillator are stacked along a line of arrangement of the main pole and the other side shield.

4. The magnetic recording head of claim 1, wherein a distance between the main pole and the trailing shield is substantially equal to a distance between the main pole and each of the side shields.

5. The magnetic recording head of claim 1, wherein a write gap magnetic field between the main pole and the trailing shield is substantially equal in intensity to a side gap magnetic field between the main pole and each side shield.

6. The magnetic recording head of claim 5, wherein an oscillation frequency of the first high-frequency oscillator is substantially equal to an oscillation frequency of the second high-frequency oscillator.

7. The magnetic recording head of claim 2, wherein the spin-injection layer of the first and second high-frequency oscillator has a smaller coercive force than a side gap magnetic field between the main pole and each side shield.

8. The magnetic recording head of claim 1, further comprising a third high-frequency oscillator provided in the write gap between the main pole and the trailing shield, wherein the third high-frequency oscillator is electrically connected to the main pole and the trailing shield, the main pole, the third high-frequency oscillator and the trailing shield constituting a power distribution circuit configured to distribute power to the main pole, the third high-frequency oscillator and the trailing shield in this order.

9. The magnetic recording head of claim 8, wherein the third high-frequency oscillator comprises a spin-injection layer, an intermediate layer, and an oscillation layer.

10. The magnetic recording head of claim 9, wherein the spin-injection layer, the intermediate layer and the oscillation layer of the third high-frequency oscillator are stacked along a line of arrangement of the main pole and the trailing shield.

11. The magnetic recording head of claim 10, wherein a distance between the main pole and the trailing shield is substantially equal to a distance between the main pole and each of the side shields.

12. The magnetic recording head of claim 10, wherein a write gap magnetic field between the main pole and the trailing shield is substantially equal in intensity to a side gap magnetic field between the main pole and each side shield.

13. The magnetic recording head of claim 8, wherein an oscillation frequency of the first high-frequency oscillator, an oscillation frequency of the second high-frequency oscillator, and an oscillation frequency of the third high-frequency oscillator are substantially equal to each other.

14. The magnetic recording head of claim 9, wherein the spin-injection layer of the third high-frequency oscillator has a smaller coercive force than a write gap magnetic field between the main pole and the trailing shield.

15. The magnetic recording head of claim 8, wherein the first, second and third high-frequency oscillators comprise a common continuous spin-injection layer electrically connected to the main pole via a first electrode layer, a common continuous intermediate layer, and a common continuous oscillation layer electrically connected to the trailing shield and the side shields via a second electrode layer.

16. A disk device comprising:
a recording medium including a magnetic recording layer;
a drive unit configured to rotate the recording medium; and
the magnetic recording head according to claim 1, configured to perform information processing on the recording medium.

17. The disk device of claim 16, wherein each of the first and second high-frequency oscillators comprises a spin-injection layer, an intermediate layer, and an oscillation layer.

18. The disk device of claim 17, further comprising a third high-frequency oscillator provided in the write gap between the main pole and the trailing shield, wherein the third high-frequency oscillator is electrically connected to the main pole and the trailing shield, the main pole, the third high-frequency oscillator and the trailing shield constituting a power distribution circuit configured to distribute power to the main pole, the third high-frequency oscillator and the trailing shield in this order.

* * * * *